(12) United States Patent
Sasaki et al.

(10) Patent No.: US 10,273,379 B2
(45) Date of Patent: *Apr. 30, 2019

(54) MULTILAYER STRUCTURE AND METHOD FOR PRODUCING SAME

(71) Applicant: KURARAY CO., LTD., Kurashiki-shi (JP)

(72) Inventors: Ryoichi Sasaki, Kurashiki (JP); Kentaro Yoshida, Houston, TX (US); Mamoru Omoda, Soja (JP); Masakazu Nakaya, Kurashiki (JP); Hiroyuki Ogi, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 593 days.

This patent is subject to a terminal disclaimer.

(21) Appl. No.: 14/765,628

(22) PCT Filed: Feb. 7, 2014

(86) PCT No.: PCT/JP2014/000683
§ 371 (c)(1),
(2) Date: Aug. 4, 2015

(87) PCT Pub. No.: WO2014/122942
PCT Pub. Date: Aug. 14, 2014

(65) Prior Publication Data
US 2015/0368503 A1     Dec. 24, 2015

(30) Foreign Application Priority Data

Feb. 8, 2013 (JP) ................. 2013-023505

(51) Int. Cl.
| | | |
|---|---|---|
| C09D 143/02 | (2006.01) |
| C08F 230/02 | (2006.01) |
| B32B 27/34 | (2006.01) |
| B32B 27/32 | (2006.01) |
| B32B 15/08 | (2006.01) |
| B32B 15/20 | (2006.01) |
| B32B 27/28 | (2006.01) |
| B32B 27/06 | (2006.01) |
| B32B 27/10 | (2006.01) |
| B32B 27/08 | (2006.01) |
| B32B 27/36 | (2006.01) |
| G02B 1/14 | (2015.01) |
| B05D 7/00 | (2006.01) |

(52) U.S. Cl.
CPC ............ *C09D 143/02* (2013.01); *B05D 7/50* (2013.01); *B32B 15/08* (2013.01); *B32B 15/20* (2013.01); *B32B 27/08* (2013.01); *B32B 27/10* (2013.01); *B32B 27/28* (2013.01); *B32B 27/32* (2013.01); *B32B 27/34* (2013.01); *B32B 27/36* (2013.01); *G02B 1/14* (2015.01); *B32B 2255/10* (2013.01); *B32B 2255/20* (2013.01); *B32B 2255/205* (2013.01); *B32B 2307/7244* (2013.01); *B32B 2439/40* (2013.01); *B32B 2439/70* (2013.01); *B32B 2439/80* (2013.01); *B32B 2457/00* (2013.01); *B32B 2457/12* (2013.01); *B32B 2457/20* (2013.01); *B32B 2457/202* (2013.01); *B32B 2457/206* (2013.01); *C08F 230/02* (2013.01); *Y10T 428/31678* (2015.04); *Y10T 428/31993* (2015.04)

(58) Field of Classification Search
None
See application file for complete search history.

(56) References Cited

U.S. PATENT DOCUMENTS

| | | | |
|---|---|---|---|
| 4,689,272 A * | 8/1987 | Simon ................... | B41N 3/038 205/139 |
| 2001/0021741 A1* | 9/2001 | Yukawa ............... | C08F 230/02 524/441 |
| 2005/0249975 A1 | 11/2005 | Sandberg et al. | |
| 2007/0218207 A1 | 9/2007 | Fringant et al. | |
| 2013/0034674 A1* | 2/2013 | Yoshida ............... | C09D 123/02 428/35.2 |

FOREIGN PATENT DOCUMENTS

| | | |
|---|---|---|
| CN | 1856539 A | 11/2006 |
| EP | 2 152 516 A1 | 2/2010 |
| EP | 2 223 846 A1 | 9/2010 |
| JP | 2002-302150 A | 10/2002 |
| JP | 2003-251732 A | 9/2003 |
| WO | WO 03/041185 A2 | 5/2003 |
| WO | WO 03/041185 A3 | 5/2003 |
| WO | 2011/122036 A1 | 10/2011 |
| WO | WO 2012/043823 A1 | 4/2012 |

OTHER PUBLICATIONS

International Search Report dated Mar. 25, 2014 in PCT/JP14/000683 Filed Feb. 7, 2014.
Extended European Search Report dated Jun. 9, 2016 in Patent Application No. 14749473.6.

(Continued)

*Primary Examiner* — Sheeba Ahmed
(74) *Attorney, Agent, or Firm* — Oblon, McClelland, Maier & Neustadt, L.L.P.

(57) ABSTRACT

A multilayer structure disclosed is a multilayer structure including at least one base (X), at least one layer (Y), and at least one layer (Z). The layer (Y) contains an aluminum atom. The layer (Z) contains a polymer (E) having a plurality of phosphorus atoms. The polymer (E) is a polymer of at least one monomer including a vinylphosphonic acid compound. The multilayer structure includes at least one pair of the layer (Y) and the layer (Z) that are contiguously stacked. The layer (Z) is formed by applying a coating liquid (V) which is a solution of the polymer (E) having a plurality of phosphorus atoms. The multilayer structure disclosed is excellent in gas barrier properties, and can maintain the gas barrier properties at a high level even when subjected to physical stresses such as deformation and impact.

19 Claims, No Drawings

(56) References Cited

OTHER PUBLICATIONS

U.S. Appl. No. 14/765,697, filed Aug. 4, 2015, Sasaki, et al.
U.S. Appl. No. 14/765,957, filed Aug. 5, 2015, Sasaki, et al.

* cited by examiner

MULTILAYER STRUCTURE AND METHOD FOR PRODUCING SAME

CROSS-REFERENCE TO RELATED APPLICATIONS

This application is a National Stage of PCT/JP2014/000683, which was filed on Feb. 7, 2014. This application is based upon and claims the benefit of priority to Japanese Application No. 2013-023505, which was filed on Feb. 8, 2013.

TECHNICAL FIELD

The present invention relates to a multilayer structure and a method for producing the same.

BACKGROUND ART

Conventionally, laminates have been well known which include: a plastic film; and a coating formed on the plastic film and containing aluminum or its oxide, alumina, as a component. The laminates are used as a packaging material having gas barrier properties for protecting articles such as foods which are susceptible to alteration by oxygen. Many of such gas barrier coatings are formed on a plastic film by a dry process such as vacuum deposition, sputtering, ion plating, or chemical vapor deposition (CVD). Aluminum-deposited films have light shielding properties as well as gas barrier properties, and are mainly used as a packaging material intended for dry foods. Alumina-deposited films, which have transparency, can allow visual recognition of package contents, and are used as a packaging material in a wide variety of applications such as retort food packaging by making use of their characteristic of permitting check for foreign matters with a metal detector and heating with a microwave oven.

A transparent gas barrier coating composed of aluminum atoms, oxygen atoms, and sulfur atoms has also been known (Patent Literature 1: JP 2003-251732 A). JP 2003-251732 A discloses a method in which a transparent coating having gas barrier properties is formed on a plastic film by reactive sputtering using aluminum as a target and a mixed gas of hydrogen sulfide and oxygen as a reaction gas.

Additionally, the present inventors have disclosed a transparent gas barrier coating composed of a reaction product of alumina particles and a phosphorus compound (Patent Literature 2: WO 2011-122036 A1). WO 2011-122036 A1 discloses a method in which a coating liquid containing alumina particles and a phosphorus compound is applied to a plastic film, followed by drying and heat treatment to form a transparent coating having gas barrier properties on the plastic film.

CITATION LIST

Patent Literature

Patent Literature 1: JP 2003-251732 A
Patent Literature 2: WO 2011-122036 A1

SUMMARY OF INVENTION

Technical Problem

The above conventional gas barrier coatings are excellent in initial gas barrier properties; however, they may suffer from defects such as cracks and pinholes when subjected to physical stresses such as deformation and impact, and may lack sufficient gas barrier properties in actual use. In the case of use as a food packaging material, physical stresses of varying magnitude are inevitably imposed at different stages including printing, lamination, bag making, food filling, transportation, displaying, and consumption. Therefore, a multilayer structure that can maintain high gas barrier properties even when subjected to such physical stresses has been desired.

Under such circumstances, an object of the present invention is to provide a multilayer structure that is excellent in gas barrier properties and that can maintain the gas barrier properties at a high level even when subjected to physical stresses such as deformation and impact, and also to provide a method for producing the multilayer structure.

Solution to Problem

As a result of diligent study aimed at achieving the above object, the present inventors have found that when a layer containing an aluminum atom and a layer containing a polymer having a plurality of phosphorus atoms are contiguously stacked, a multilayer structure can be obtained that is excellent in gas barrier properties and that can maintain the gas barrier properties a high level even when subjected to physical stresses such as deformation and impact. That is, when a layer that contains a polymer having a plurality of phosphorus atoms and that does not have gas barrier properties was stacked contiguously with a layer that contains an aluminum atom and that has gas barrier properties, the flexibility of the resulting multilayer structure was significantly improved. Through further study based on these new findings, the present inventors have completed the present invention.

That is, the multilayer structure of the present invention is a multilayer structure including at least one base (X), at least one layer (Y), and at least one layer (Z), wherein the layer (Y) contains an aluminum atom, the layer (Z) contains a polymer (E) having a plurality of phosphorus atoms, the polymer (E) is a polymer of at least one monomer including a vinylphosphonic acid compound, and the multilayer structure includes at least one pair of the layer (Y) and the layer (Z) that are contiguously stacked.

The multilayer structure of the present invention may have a configuration including at least one set of the base (X), the layer (Y), and the layer (Z) that are stacked in order of the base (X)/the layer (Y)/the layer (Z).

In the multilayer structure of the present invention, the polymer (E) may be poly(vinylphosphonic acid) represented by the following general formula (I).

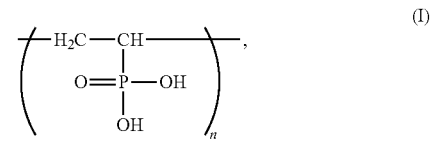

where n is a natural number.

In the multilayer structure of the present invention, the layer (Y) may be a layer (YA) containing a reaction product (R). The reaction product (R) is a reaction product formed by reaction between a metal oxide (A) containing aluminum and a phosphorus compound (B). In an infrared absorption spectrum of the layer (YA), a wavenumber ($n^1$) at which infrared absorption in the range of 800 to 1400 cm$^{-1}$ reaches a maximum may be 1080 to 1130 cm$^{-1}$.

In the multilayer structure of the present invention, an absorbance ($\alpha^1$) at the wavenumber ($n^1$) and an absorbance ($\alpha^2$) at a wavenumber ($n^2$) in the infrared absorption spectrum of the layer (YA) may satisfy a relationship of absorbance ($\alpha^2$)/absorbance ($\alpha^1$)≤0.2. The wavenumber ($n^2$) is a wavenumber at which, in the infrared absorption spectrum of the layer (YA), infrared absorption due to stretching vibration of a hydroxyl group in the range of 2500 to 4000 cm$^{-1}$ reaches a maximum.

In the multilayer structure of the present invention, a half width of an absorption peak at the wavenumber ($n^1$) may be 200 cm$^{-1}$ or less.

In the multilayer structure of the present invention, the metal oxide (A) may be a hydrolytic condensate of a compound (L) containing a metal atom (M) to which a hydrolyzable group is bonded, and the compound (L) may include at least one compound ($L^1$) represented by the following formula (II):

where $X^1$ is selected from the group consisting of F, Cl, Br, I, $R^2O$—, $R^3C(\!=\!O)O$—, $(R^4C(\!=\!O))_2CH$—, and $NO_3$, $R^1$, $R^2$, $R^3$, and $R^4$ are each selected from the group consisting of an alkyl group, an aralkyl group, an aryl group, and an alkenyl group, and m represents an integer of 1 to 3. When a plurality of $X^1$ are present in the formula (II), the plurality of $X^1$ may be the same as or different from each other. When a plurality of $R^1$ are present in the formula (II), the plurality of $R^1$ may be the same as or different from each other. When a plurality of $R^2$ are present in the formula (II), the plurality of $R^2$ may be the same as or different from each other. When a plurality of $R^3$ are present in the formula (II), the plurality of $R^3$ may be the same as or different from each other. When a plurality of $R^4$ are present in the formula (II), the plurality of $R^4$ may be the same as or different from each other.

In the multilayer structure of the present invention, the compound ($L^1$) may be at least one compound selected from aluminum triisopropoxide and aluminum tri-s-butoxide.

In the multilayer structure of the present invention, the phosphorus compound (B) may be at least one compound selected from the group consisting of phosphoric acid, polyphosphoric acid, phosphorous acid, phosphonic acid, and derivatives thereof.

In the multilayer structure of the present invention, the number of moles $N_M$ of metal atoms (M) constituting the metal oxide (A) and the number of moles $N_P$ of phosphorus atoms derived from the phosphorus compound (B) may satisfy a relationship of 1.0≤(the number of moles $N_M$)/(the number of moles $N_P$)≤3.6 in the layer (YA).

In the multilayer structure of the present invention, the layer (Y) may be a deposited layer of aluminum or a deposited layer of aluminum oxide.

In the multilayer structure of the present invention, the base (X) may include at least one layer selected from the group consisting of a thermoplastic resin film layer, a paper layer, and an inorganic deposited layer.

The multilayer structure of the present invention may have an oxygen transmission rate of 2 ml/(m$^2$·day·atm) or less at 20° C. and 85% RH.

The multilayer structure of the present invention may have an oxygen transmission rate of 4 ml/(m$^2$·day·atm) or less at 20° C. and 85% RH as measured after the multilayer structure is kept stretched by 5% at 23° C. and 50% RH for 5 minutes.

The production method of the present invention is a method for producing a multilayer structure including at least one base (X), at least one layer (Y), and at least one layer (Z), the layer (Y) containing an aluminum atom, the layer (Z) containing a polymer (E) having a plurality of phosphorus atoms, the polymer (E) being a polymer of at least one monomer including a vinylphosphonic acid compound, the multilayer structure including at least one pair of the layer (Y) and the layer (Z) that are contiguously stacked, the method including a step (IV) of forming the layer (Z) by applying a coating liquid (V) containing the polymer (E).

In the production method of the present invention, the polymer (E) may be poly(vinylphosphonic acid) represented by the general formula (I) below.

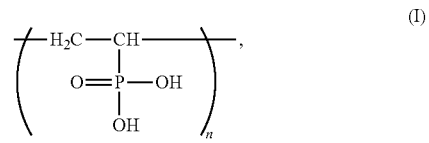

where n is a natural number.

In the production method of the present invention, the layer (Y) may be a layer (YA) containing a reaction product (R), and the reaction product (R) may be a reaction product formed by reaction between a metal oxide (A) containing aluminum and a phosphorus compound (B). In this case, the production method of the present invention may further include: a step (I) of mixing the metal oxide (A), at least one compound having a site capable of reacting with the metal oxide (A), and a solvent so as to prepare a coating liquid (U) containing the metal oxide (A), the at least one compound, and the solvent; a step (II) of applying the coating liquid (U) onto the base (X) so as to form a precursor layer of the layer (YA) on the base (X); and a step (III) of heat-treating the precursor layer of the layer (YA) at a temperature of 110° C. or more so as to form the layer (YA). The at least one compound may include the phosphorus compound (B). In the coating liquid (U), the number of moles $N_M$ of metal atoms (M) constituting the metal oxide (A) and the number of moles $N_P$ of phosphorus atoms contained in the phosphorus compound (B) may satisfy a relationship of 1.0≤(the number of moles $N_M$)/(the number of moles $N_P$)≤3.6.

In the production method of the present invention, the step (IV) may be carried out after the step (III).

In the production method of the present invention, the layer (Y) may be a deposited layer of aluminum or a deposited layer of aluminum oxide.

Advantageous Effects of Invention

According to the present invention, it is possible to obtain a multilayer structure that is excellent in gas barrier properties and that can maintain the gas barrier properties a high level even when subjected to physical stresses such as deformation and impact. Also, with the production method of the present invention, the multilayer structure can easily be produced.

In the present description, the capability to maintain the gas barrier properties at a high level even when physical stresses such as deformation and impact are imposed may be referred to as "flexibility". Also, in the present description, "gas barrier properties as measured after keeping a 5% stretched state at 23° C. and 50% RH for 5 minutes" are used as an index for evaluation of the flexibility. The above evaluation conditions are harsher than usual conditions under which physical stresses can occur in practical use. Therefore, a multilayer structure that yields a good evaluation result for this index can be expected to show good performance in practical use.

DESCRIPTION OF EMBODIMENTS

Hereinafter, embodiments of the present invention will be described. In the following, specific materials (compounds etc.) may be mentioned as examples of those exerting particular functions; however, the present invention is not limited to embodiments using such materials. Additionally, the materials mentioned as examples may be used alone or two or more thereof may be used in combination, unless otherwise specified.

[Multilayer Structure]

The multilayer structure of the present invention is a multilayer structure including at least one base (X), at least one layer (Y), and at least one layer (Z). The layer (Y) contains an aluminum atom. The layer (Z) contains a polymer (E) having a plurality of phosphorus atoms. The polymer (E) is a polymer of at least one monomer including a vinylphosphonic acid compound. The multilayer structure includes at least one pair of the layer (Y) and the layer (Z) that are contiguously stacked. Such a multilayer structure can be obtained by the method of the present invention for producing a multilayer structure.

[Layer (Y)]

The layer (Y) included in the multilayer structure of the present invention may be a layer (YA) containing a reaction product (R) formed by reaction between a metal oxide (A) containing at least aluminum and a phosphorus compound (B). Alternatively, the layer (Y) may be a deposited layer of aluminum (which may be referred to as "layer (YB)" hereinafter) or a deposited layer of aluminum oxide (which may be referred to as "layer (YC)" hereinafter). These layers will now be described in order.

[Layer (YA)]

When the layer (Y) included in the multilayer structure of the present invention is the layer (YA), a wavenumber ($n^1$) at which, in an infrared absorption spectrum of the layer (YA), infrared absorption in the range of 800 to 1400 $cm^{-1}$ reaches a maximum may be 1080 to 1130 $cm^{-1}$.

The wavenumber ($n^1$) may be referred to as "maximum absorption wavenumber ($n^1$)" hereinafter. The metal oxide (A) is generally in the form of particles of the metal oxide (A) when reacting with the phosphorus compound (B).

Typically, the layer (YA) included in the multilayer structure of the present invention has a structure in which the particles of the metal oxide (A) are bonded together via phosphorus atoms derived from the phosphorus compound (B). The forms in which the particles are bonded via phosphorus atoms include a form in which the particles are bonded via an atomic group containing a phosphorus atom, and examples thereof include a form in which the particles are bonded via an atomic group containing a phosphorus atom and being devoid of any metal atoms.

In the layer (YA) included in the multilayer structure of the present invention, the number of moles of metal atoms binding the particles of the metal oxide (A) together and not being derived from the metal oxide (A) is preferably in the range of 0 to 1 times (e.g., 0 to 0.9 times) the number of moles of phosphorus atoms binding the particles of the metal oxide (A) together. The number of moles of such metal atoms may be, for example, 0.3 times or less, 0.05 times or less, 0.01 times or less, or 0 times the number of moles of the phosphorus atoms.

The layer (YA) included in the multilayer structure of the present invention may partially contain the metal oxide (A) and/or phosphorus compound (B) that has not been involved in the reaction.

Generally, when a metal compound and a phosphorus compound react with each other to produce a bond represented by M-O—P in which a metal atom (M) constituting the metal compound and a phosphorus atom (P) derived from the phosphorus compound are bonded via an oxygen atom (O), a characteristic peak appears in an infrared absorption spectrum. The characteristic peak shows an absorption peak at a particular wavenumber depending on the environment or structure around the bond. As a result of study by the present inventors, it has been found that when the absorption peak due to the M-O—P bond is located in the range of 1080 to 1130 $cm^{-1}$, the resulting multilayer structure exhibits excellent gas barrier properties. Particularly, it has been found that when the absorption peak appears as an absorption peak at the maximum absorption wavenumber in the region of 800 to 1400 $cm^{-1}$ where absorptions attributed to bonds between various atoms and oxygen atoms are generally observed, the resulting multilayer structure exhibits more excellent gas barrier properties.

Although the present invention is not limited in any respect by the following hypothesis, it is inferred that when the particles of the metal oxide (A) are bonded together via phosphorus atoms derived from the phosphorus compound (B) and not via metal atoms not being derived from the metal oxide (A) so as to produce the bond represented by M-O—P in which the metal atom (M) constituting the metal oxide (A) and the phosphorus atom (P) are bonded via the oxygen atom (O), the absorption peak due to the M-O—P bond in the infrared absorption spectrum of the layer (YA) appears in the range of 1080 to 1130 $cm^{-1}$ as an absorption peak at the maximum absorption wavenumber in the region of 800 to 1400 $cm^{-1}$, due to the fact that the bond is produced in a relatively definite environment, that is, on the surfaces of the particles of the metal oxide (A).

By contrast, when a metal compound, such as a metal alkoxide or a metal salt, which does not involve the formation of a metal oxide, is mixed with the phosphorus compound (B) beforehand and then hydrolytic condensation is carried out, a composite material is obtained in which the metal atoms derived from the metal compound and the phosphorus atoms derived from the phosphorus compound (B) have been almost homogeneously mixed and reacted, and, in the infrared absorption spectrum of the composite material, the maximum absorption wavenumber ($n^1$) in the range of 800 to 1400 $cm^{-1}$ falls outside the range of 1080 to 1130 $cm^{-1}$.

In terms of obtaining the multilayer structure that is more excellent in gas barrier properties, the maximum absorption wavenumber ($n^1$) is preferably in the range of 1085 to 1120 $cm^{-1}$ and more preferably in the range of 1090 to 1110 $cm^{-1}$.

In the infrared absorption spectrum of the layer (YA) included in the multilayer structure of the present invention, absorption due to stretching vibration of hydroxyl groups bonded to various atoms may be observed in the range of 2500 to 4000 $cm^{-1}$. Examples of the hydroxyl groups showing absorption in this range include: a hydroxyl group present in the form of M-OH on the surface of the metal oxide (A)-derived portion; a hydroxyl group bonded to the phosphorus atom (P) derived from the phosphorus compound (B) and present in the form of P—OH; and a hydroxyl group present in the form of C—OH derived from the polymer (C) described later. The amount of hydroxyl groups present in the layer (YA) can be associated with an absorbance ($\alpha^2$) at a wavenumber ($n^2$) at which the maximum absorption due to the stretching vibration of hydroxyl groups in the range of 2500 to 4000 $cm^{-1}$ occurs. The wavenumber ($n^2$) is a wavenumber at which, in the infrared absorption spectrum of the layer (YA), the infrared absorption due to the stretching vibration of hydroxyl groups in the range of 2500 to 4000 $cm^{-1}$ reaches a maximum. Hereinafter, the wavenumber ($n^2$) may be referred to as "maximum absorption wavenumber ($n^2$)".

The greater is the amount of hydroxyl groups present in the layer (YA), the lower is the denseness of the layer (YA), and consequently the poorer are the gas barrier properties. Furthermore, it is thought that the smaller is the ratio [absorbance ($\alpha^2$)/absorbance ($\alpha^1$)] between the absorbance ($\alpha^1$) at the maximum absorption wavenumber ($n^1$) and the absorbance ($\alpha^2$) in the infrared absorption spectrum of the layer (YA) included in the multilayer structure of the present invention, the more effectively the particles of the metal oxide (A) are bonded together via the phosphorus atoms derived from the phosphorus compound (B). Therefore, in terms of enabling the resulting multilayer structure to exhibit a high level of gas barrier properties, the ratio [absorbance ($\alpha^2$)/absorbance ($\alpha^1$)] is preferably 0.2 or less, and more preferably 0.1 or less. The multilayer structure including the layer (YA) showing such a value of the ratio [absorbance ($\alpha^2$)/absorbance ($\alpha^1$)] can be obtained by adjusting, for example, heat treatment conditions or the later-described ratio of the number of moles ($N_M$) of the metal atoms constituting the metal oxide (A) to the number of moles ($N_P$) of the phosphorus atoms derived from the phosphorus compound (B). In the infrared absorption spectrum of the later-described precursor layer of the layer (YA), the maximum absorbance ($\alpha^{1'}$) in the range of 800 to 1400 $cm^{-1}$ and the maximum absorbance ($\alpha^{2'}$) due to stretching vibration of hydroxyl groups in the range of 2500 to 4000 $cm^{-1}$ may satisfy a relationship of absorbance ($\alpha^{2'}$)/absorbance ($\alpha^{1'}$)>0.2, although the present invention is not particularly limited by this relationship.

In the infrared absorption spectrum of the layer (YA) included in the multilayer structure of the present invention, the half width of the absorption peak with a maximum at the maximum absorption wavenumber ($n^1$) is preferably 200 $cm^{-1}$ or less, more preferably 150 $cm^{-1}$ or less, more preferably 130 $cm^{-1}$ or less, more preferably 110 $cm^{-1}$ or less, even more preferably 100 $cm^{-1}$, and particularly preferably 50 $cm^{-1}$, in terms of the gas barrier properties of the resulting multilayer structure. Although the present invention is not limited in any respect by the following hypothesis, it is inferred that when the particles of the metal oxide (A) are bonded together via phosphorus atoms derived from the phosphorus compound (B) and not via metal atoms not being derived from the metal oxide (A) so as to produce the bond represented by M-O—P in which the metal atom (M) constituting the metal oxide (A) and the phosphorus atom (P) are bonded via the oxygen atom (O), the half width of the absorption peak with a maximum at the maximum absorption wavenumber ($n^1$) falls within the above range due to the fact that the bond is produced in a relatively definite environment, that is, on the surfaces of the particles of the metal oxide (A). In the present description, the half width of the absorption peak at the maximum absorption wavenumber ($n^1$) can be obtained by determining two wavenumbers at which the absorbance is a half of the absorbance ($\alpha^1$) (absorbance ($\alpha^1$)/2) in the absorption peak and calculating the difference between the two wavenumbers.

The infrared absorption spectrum of the layer (YA) thus far described can be obtained by measurement with ATR (attenuated total reflection) method or by scraping the layer (YA) from the multilayer structure and then measuring the infrared absorption spectrum of the scraped layer (YA) by KBr method.

In the layer (YA) included in the multilayer structure of the present invention, the shape of each of the particles of the metal oxide (A) is not particularly limited, and examples of the shape include a spherical shape, a flat shape, a polygonal shape, a fibrous shape, and a needle shape. A fibrous or needle shape is preferable in terms of obtaining the multilayer structure that is more excellent in gas barrier properties. The layer (YA) may contain only a single type of particles having the same shape or may contain two or more types of particles having different shapes. The size of the particles of the metal oxide (A) is not particularly limited either, and examples of the particles include those having a size on the order of nanometers to submicrons. In terms of obtaining the multilayer structure that is more excellent in gas barrier properties, the size of the particles of the metal oxide (A) is preferably such that the average particle diameter is in the range of 1 to 100 nm.

Such a fine structure as described above of the layer (YA) included in the multilayer structure of the present invention can be confirmed by observing a cross-section of the layer (YA) with a transmission electron microscope (TEM). In addition, the particle diameter of each of the particles of the metal oxide (A) in the layer (YA) can be determined as an average value of the maximum length of the particle along the longest axis and the maximum length of the particle along an axis perpendicular to the longest axis, using a cross-sectional image of the layer (YA) taken by a transmission electron microscope (TEM). The above-specified average diameter can be determined by averaging the particle diameters of ten randomly selected particles in the cross-sectional image.

In one example, the layer (YA) included in the multilayer structure of the present invention has a structure in which the particles of the metal oxide (A) are bonded together via phosphorus atoms derived from the phosphorus compound (B) and not via metal atoms not being derived from the metal oxide (A). That is, in one example, the layer (YA) has a structure in which the particles of the metal oxide (A) may be bonded via metal atoms derived from the metal oxide (A) but are not bonded via other metal atoms. The "structure in which the particles of the metal oxide (A) are bonded together via phosphorus atoms derived from the phosphorus compound (B) and not via metal atoms not being derived from the metal oxide (A)" refers to a structure in which the main chain in the bond between the bonded particles of the metal oxide (A) has a phosphorus atom derived from the phosphorus compound (B) and does not have any metal atoms that are not derived from the metal oxide (A), and embraces a structure in which the side chain in the bond has a metal atom. It should be noted that the layer (YA) included in the multilayer structure of the present invention may partially have a structure in which the particles of the metal oxide (A) are bonded together via both phosphorus atoms derived from the phosphorus compound (B) and metal atoms (structure in which the main chain in the bond between the bonded particles of the metal oxide (A) has both a phosphorus atom derived from the phosphorus compound (B) and a metal atom).

Examples of the form of bonding between each particle of the metal oxide (A) and a phosphorus atom in the layer (YA) included in the multilayer structure of the present invention include a form in which the metal atom (M) constituting the metal oxide (A) and the phosphorus atom (P) are bonded via the oxygen atom (O). The particles of the metal oxide (A) may be bonded together via the phosphorus atom (P) derived from one molecule of the phosphorus compound (B), or may be bonded together via the phosphorus atoms (P) derived from two or more molecules of the phosphorus compound (B). Specific examples of the form of bonding between two particles of the metal oxide (A) bonded together include: a bonding form represented by (Mα)-O—P—O-(Mβ); a bonding form represented by (Mα)-O—P—[O—P]$_n$—O-(Mβ); a bonding form represented by (Mα)-O—P—Z—P—O-(Mβ); and a bonding form represented by (Mα)-O—P—Z—P—[O—P—Z—P]$_n$—O-(Mβ), where (Mα) denotes a metal atom constituting one of the bonded particles of the metal oxide (A), and (Mβ) denotes a metal atom constituting the other of the particles of the metal oxide (A). In the above examples of the bonding form, n represents an integer of 1 or more, Z represents a constituent atomic group present between two phosphorus atoms in the case where the phosphorus compound (B) has two or more phosphorus atoms per molecule, and the other substituents bonded to the phosphorus atoms are omitted. In the layer (YA) included in the multilayer structure of the present invention, it is preferable that one particle of the metal oxide (A) be bonded to a plurality of other particles of the metal oxide (A), in terms of the gas barrier properties of the resulting multilayer structure.

The metal oxide (A) may be a hydrolytic condensate of a compound (L) containing the metal atom (M) to which a hydrolyzable characteristic group is bonded. Examples of the characteristic group include $X^1$ in the formula (II) described later.

The hydrolytic condensate of the compound (L) can be regarded substantially as a metal oxide. In this description, therefore, the hydrolytic condensate of the compound (L) may be referred to as "metal oxide (A)". That is, in this description, "metal oxide (A)" can be interpreted to mean "hydrolytic condensate of the compound (L)", while "hydrolytic condensate of the compound (L)" can be interpreted to mean "metal oxide (A)".

[Metal Oxide (A)]

Examples of the metal atoms constituting the metal oxide (A) (the metal atoms may be collectively referred to as "metal atom (M)") include metal atoms having two or more valences (e.g., two to four valences or three to four valences), and specific examples of the metals include: Group 2 metals in the periodic table such as magnesium and calcium; Group 12 metals in the periodic table such as zinc; Group 13 metals in the periodic table such as aluminum; Group 14 metals in the periodic table such as silicon; and transition metals such as titanium and zirconium. In some cases, silicon is classified as a semimetal. In the present description, however, silicon is considered to fall under the category of metals. The metal atom (M) constituting the metal oxide (A), although it may consist of one type of atoms or may include two or more types of atoms, needs to include at least aluminum. In terms of ease of handling in production of the metal oxide (A) and in terms of more excellent gas barrier properties of the resulting multilayer structure, another metal atom (M) used in combination with aluminum is preferably at least one selected from the group consisting of titanium and zirconium.

The total proportion of aluminum, titanium, and zirconium in the metal atom (M) may be 60 mol % or more, 70 mol % or more, 80 mol % or more, 90 mol % or more, 95 mol % or more, or 100 mol %. The proportion of aluminum in the metal atom (M) may be 60 mol % or more, 70 mol % or more, 80 mol % or more, 90 mol % or more, 95 mol % or more, or 100 mol %.

A metal oxide produced by a method such as liquid-phase synthesis, gas-phase synthesis, or solid grinding, can be used as the metal oxide (A). In view of the controllability of the shape and size, and the production efficiency, of the metal oxide (A) to be obtained, the metal oxide (A) is preferably one produced by liquid-phase synthesis.

In the case of liquid-phase synthesis, the compound (L) in which a hydrolyzable characteristic group is bonded to the metal atom (M) is used as a raw material, and is subjected to hydrolytic condensation. Thus, the metal oxide (A) can be synthesized as a hydrolytic condensate of the compound (L). It should be noted that the metal atom (M) contained in the compound (L) needs to include at least aluminum. In the production of the hydrolytic condensate of the compound (L) by liquid-phase synthesis, the metal oxide (A) can be produced not only by the method using the compound (L) itself as a raw material but also by methods in which any one of the following is used as a raw material and subjected to condensation or hydrolytic condensation: a partial hydrolysate of the compound (L) formed by partial hydrolysis of the compound (L); a complete hydrolysate of the compound (L) formed by complete hydrolysis of the compound (L); a partial hydrolytic condensate of the compound (L) formed by partial hydrolytic condensation of the compound (L); a condensate formed by condensation of a part of a complete hydrolysate of the compound (L); and a mixture of two or more thereof. The metal oxide (A) thus obtained is also considered a "hydrolytic condensate of the compound (L)" in the present description. The type of the above-mentioned hydrolyzable characteristic group (functional group) is not particularly limited. Examples thereof include halogen atoms (such as F, Cl, Br, and I), alkoxy groups, acyloxy groups, diacylmethyl groups, and nitro groups. In terms of better reaction controllability, halogen atoms and alkoxy groups are preferable, and alkoxy groups are more preferable.

In terms of easy reaction control and of more excellent gas barrier properties of the resulting multilayer structure, the compound (L) preferably includes at least one compound ($L^1$) represented by the formula (II) below.

$$AlX^1{}_m R^1{}_{(3-m)} \quad (II),$$

where $X^1$ is selected from the group consisting of F, Cl, Br, I, $R^2O$—, $R^3C(\!=\!O)O$—, $(R^4C(\!=\!O))_2CH$—, and $NO_3$, $R^1$, $R^2$, $R^3$, and $R^4$ are each selected from the group consisting of an alkyl group, an aralkyl group, an aryl group, and an alkenyl group, and m represents an integer of 1 to 3. When a plurality of $X^1$ are present in the formula (II), the plurality of $X^1$ may be the same as or different from each other. When a plurality of $R^1$ are present in the formula (II), the plurality of $R^1$ may be the same as or different from each other. When a plurality of $R^2$ are present in the formula (II), the plurality of $R^2$ may be the same as or different from each other. When a plurality of $R^3$ are present in the formula (II), the plurality of $R^3$ may be the same as or different from each other. When a plurality of $R^4$ are present in the formula (II), the plurality of $R^4$ may be the same as or different from each other.

Examples of the alkyl group represented by $R^1$, $R^2$, $R^3$, and $R^4$ include a methyl group, an ethyl group, a normalpropyl group, an isopropyl group, a normal-butyl group, a s-butyl group, a t-butyl group, and a 2-ethylhexyl group. Examples of the aralkyl group represented by $R^1$, $R^2$, $R^3$, and $R^4$ include a benzyl group, a phenethyl group, and a trityl group. Examples of the aryl group represented by $R^1$, $R^2$, $R^3$, and $R^4$ include a phenyl group, a naphthyl group, a tolyl group, a xylyl group, and a mesityl group. Examples of the alkenyl group represented by $R^1$, $R^2$, $R^3$, and $R^4$ include a vinyl group and an allyl group. For example, $R^1$ is preferably an alkyl group having 1 to 10 carbon atoms, and more preferably an alkyl group having 1 to 4 carbon atoms. $X^1$ is preferably F, Cl, Br, I, or $R^2O$—. In a preferred example of the compound ($L^1$), $X^1$ is a halogen atom (F, Cl, Br, or I) or an alkoxy group ($R^2O$—) having 1 to 4 carbon atoms, and m is 3. In one example of the compound ($L^1$), $X^1$ is a halogen atom (F, Cl, Br, or I) or an alkoxy group ($R^2O$—) having 1 to 4 carbon atoms, and m is 3.

The compound (L) may include at least one compound represented by the formula (III) below in addition to the compound ($L^1$).

$$M^1 X^1_m R^1_{(n-m)} \tag{III},$$

where $M^1$ represents Ti or Zr, $X^1$ is selected from the group consisting of F, Cl, Br, I, $R^2O$—, $R^3C(=O)O$—, $(R^4C(=O))_2CH$—, and $NO_3$, $R^1$, $R^2$, $R^3$, and $R^4$ are each selected from the group consisting of an alkyl group, an aralkyl group, an aryl group, and an alkenyl group, n is equal to the valence of $M^1$, and m represents an integer of 1 to n. When a plurality of $X^1$ are present in the formula (III), the plurality of $X^1$ may be the same as or different from each other. When a plurality of $R^1$ are present in the formula (III), the plurality of $R^1$ may be the same as or different from each other. When a plurality of $R^2$ are present in the formula (III), the plurality of $R^2$ may be the same as or different from each other. When a plurality of $R^3$ are present in the formula (III), the plurality of $R^3$ may be the same as or different from each other. When a plurality of $R^4$ are present in the formula (III), the plurality of $R^4$ may be the same as or different from each other.

Specific examples of the compound ($L^1$) include aluminum compounds such as aluminum chloride, aluminum triethoxide, aluminum tri-normal-propoxide, aluminum tri-isopropoxide, aluminum tri-normal-butoxide, aluminum tri-s-butoxide, aluminum tri-t-butoxide, aluminum triacetate, aluminum acetylacetonate, and aluminum nitrate. Among these, at least one compound selected from aluminum tri-isopropoxide and aluminum tri-s-butoxide is preferable as the compound ($L^1$). One compound ($L^1$) may be used alone, or two or more compounds ($L^1$) may be used in combination.

The proportion of the compound ($L^1$) in the compound (L) is not particularly limited as long as the effect of the present invention is obtained. The proportion of a compound other than the compound ($L^1$) in the compound (L) is, for example, 20 mol % or less, 10 mol % or less, 5 mol % or less, or 0 mol %. In an example, the compound (L) consists only of the compound ($L^1$).

The compound (L) other than the compound ($L^1$) is not particularly limited as long as the effect of the present invention is obtained. Examples of the other compound include compounds in which the hydrolyzable characteristic group mentioned above is bonded to an atom of metal such as titanium, zirconium, magnesium, calcium, zinc, or silicon. In some cases, silicon is classified as a semimetal. In the present description, however, silicon is considered to fall under the category of metals. Among such compounds, those having titanium or zirconium as the metal atom are preferable as the compound (L) other than the compound ($L^1$) in terms of more excellent gas barrier properties of the resulting multilayer structure. Specific examples of the compound (L) other than the compound ($L^1$) include titanium compounds such as titanium tetraisopropoxide, titanium tetra-normal-butoxide, titanium tetra(2-ethylhexoxide), titanium tetramethoxide, titanium tetraethoxide, and titanium acetylacetonate; and zirconium compounds such as zirconium tetra-normal-propoxide, zirconium tetrabutoxide, and zirconium tetraacetylacetonate.

As a result of hydrolysis of the compound (L), at least some of the hydrolyzable characteristic groups contained in the compound (L) are substituted by hydroxyl groups. Furthermore, the hydrolysate is condensed to form a compound in which the metal atoms (M) are bonded via the oxygen atom (O). By repetitions of the condensation, a compound that can be regarded substantially as a metal oxide is formed. Generally, hydroxyl groups are present on the surface of the thus formed metal oxide (A).

In the present description, a compound is categorized as the metal oxide (A) when the ratio of the number of moles of oxygen atoms bonded only to the metal atoms (M) to the number of moles of the metal atoms (M) ([the number of moles of oxygen atoms bonded only to the metal atoms (M)]/[the number of moles of the metal atoms (M)]) is 0.8 or more in the compound. Here, "oxygen atoms bonded only to the metal atoms (M)" include, for example, the oxygen atom (O) in the structure represented by M-O-M, and do not include, for example, oxygen atoms that are bonded to the metal atoms (M) and to hydrogen atoms (H) as is the case for the oxygen atom (O) in the structure represented by M-O—H. In the metal oxide (A), the above ratio is preferably 0.9 or more, more preferably 1.0 or more, and even more preferably 1.1 or more. The upper limit of the ratio is not particularly specified. When the valence of the metal atom (M) is denoted by n, the upper limit is generally represented by n/2.

In order for the above-described hydrolytic condensation to take place, it is important that the compound (L) have a hydrolyzable characteristic group (functional group). When there is no such a group bonded, hydrolytic condensation reaction does not take place or proceeds very slowly, which makes difficult the preparation of the metal oxide (A) intended.

For example, the hydrolytic condensate can be produced from a particular raw material by a technique employed in commonly-known sol-gel processes. At least one (which may be referred to as a "compound (L)-based substance" hereinafter) selected from the group consisting of the compound (L), a partial hydrolysate of the compound (L), a complete hydrolysate of the compound (L), a partial hydrolytic condensate of the compound (L), and a condensate formed by condensation of a part of a complete hydrolysate of the compound (L), can be used as the raw material. These raw materials may be produced by commonly-known methods or may be commercially-available products. For example, the raw material that can be used is, but not limited to, a condensate obtained by hydrolytic condensation of about 2 to 10 molecules of the compound (L). Specifically, for example, a dimeric to decameric condensate obtained by hydrolytic condensation of aluminum triisopropoxide can be used as a part of the raw material.

The number of condensed molecules in the hydrolytic condensate of the compound (L) can be controlled by the conditions for condensation or hydrolytic condensation of the compound (L)-based substance. For example, the number of condensed molecules can be controlled by the amount of water, the type and concentration of a catalyst, and the temperature and time of the condensation or hydrolytic condensation.

As described above, the layer (YA) included in the multilayer structure of the present invention contains the reaction product (R), and the reaction product (R) is a reaction product formed by reaction between the metal oxide (A) containing at least aluminum and the phosphorus compound (B). Such a reaction product can be formed by mixing and reacting the metal oxide (A) with the phosphorus compound (B). The metal oxide (A) to be mixed with the phosphorus compound (B) (the metal oxide (A) immediately before mixing) may be the metal oxide (A) itself or may be in the form of a composition including the metal oxide (A). In a preferred example, the metal oxide (A) mixed with the phosphorus compound (B) is in the form of a liquid (a solution or a dispersion) obtained by dissolving or dispersing the metal oxide (A) in a solvent.

A preferred method for producing the solution or dispersion of the metal oxide (A) will now be described. Specifically, a method for producing a dispersion of the metal oxide (A) will be described using an example in which the metal oxide (A) does not contain any metal atoms other than the aluminum atom, that is, an example in which the metal oxide (A) is aluminum oxide (alumina). However, similar production methods can be employed for production of solutions or dispersions containing other metal atoms. A preferred alumina dispersion can be obtained as follows: an alumina slurry is formed by subjecting an aluminum alkoxide to hydrolytic condensation in an aqueous solution having been pH-adjusted with an acid catalyst as necessary, and then the slurry is deflocculated in the presence of a particular amount of an acid.

The temperature of the reaction system for the hydrolytic condensation of the aluminum alkoxide is not particularly limited. The temperature of the reaction system is generally in the range of 2 to 100° C. The liquid temperature is increased by contact between water and the aluminum alkoxide. However, a situation may arise where an alcohol having a lower boiling point than water is formed as a by-product along with the progress of hydrolysis, and the alcohol is volatilized and thereby prevents the temperature of the reaction system from increasing from around the boiling point of the alcohol. In such a situation, the growth of alumina may be slowed. Therefore, it is effective to remove the alcohol by heating up to around 95° C. The reaction time varies depending on the reaction conditions (the presence/absence, amount, and type of an acid catalyst). The reaction time is generally in the range of 0.01 to 60 hours, preferably in the range of 0.1 to 12 hours, and more preferably in the range of 0.5 to 6 hours. The reaction can be carried out in an atmosphere of a gas selected from various gases such as air, carbon dioxide, nitrogen, and argon.

The molar amount of water used in the hydrolytic condensation is preferably 1 to 200 times and more preferably 10 to 100 times the molar amount of the aluminum alkoxide. The molar amount of water less than the molar amount of the aluminum alkoxide does not allow hydrolysis to proceed sufficiently, and thus is not preferable. The molar amount of water more than 200 times the molar amount of the aluminum alkoxide leads to deterioration in production efficiency or increase in viscosity, and thus is not preferable. In the case where a water-containing substance (e.g., hydrochloric acid or nitric acid) is used, the amount of water used is preferably determined in view of the amount of water introduced with the substance.

As the acid catalyst used in the hydrolytic condensation, hydrochloric acid, sulfuric acid, nitric acid, p-toluenesulfonic acid, benzoic acid, acetic acid, lactic acid, butyric acid, carbonic acid, oxalic acid, maleic acid, or the like, can be used. Among these, hydrochloric acid, sulfuric acid, nitric acid, acetic acid, lactic acid, and butyric acid are preferable. More preferred are nitric acid and acetic acid. In the case where an acid catalyst is used in hydrolytic condensation, the acid catalyst is preferably used in an appropriate amount depending on the type of the acid so that the pH is in the range of 2.0 to 4.0 before the hydrolytic condensation.

The alumina slurry obtained by the hydrolytic condensation may as such be used as the alumina dispersion. However, when the obtained alumina slurry is deflocculated by heating in the presence of a particular amount of an acid, a transparent alumina dispersion excellent in viscosity stability can be obtained.

As the acid used in deflocculation, a monovalent inorganic or organic acid such as nitric acid, hydrochloric acid, perchloric acid, formic acid, acetic acid, or propionic acid, can be used. Among these, nitric acid, hydrochloric acid, and acetic acid are preferable. More preferred are nitric acid and acetic acid.

In the case where nitric acid or hydrochloric acid is used as the acid for the deflocculation, the molar amount of the acid is preferably 0.001 to 0.4 times and more preferably 0.005 to 0.3 times the molar amount of aluminum atoms. When the molar amount of the acid is less than 0.001 times the molar amount of aluminum atoms, there may arise unfavorable situations, such as where the deflocculation does not proceed sufficiently or requires a very long time. When the molar amount of the acid is more than 0.4 times the molar amount of aluminum atoms, the temporal stability of the resulting alumina dispersion tends to be reduced.

In the case where acetic acid is used as the acid for the deflocculation, the molar amount of the acid is preferably 0.01 to 1.0 times and more preferably 0.05 to 0.5 times the molar amount of aluminum atoms. When the molar amount of the acid is less than 0.01 times the molar amount of aluminum atoms, there may arise unfavorable situations, such as where the deflocculation does not proceed sufficiently or requires a very long time. When the molar amount of the acid is more than 1.0 time the molar amount of aluminum atoms, the temporal stability of the resulting alumina dispersion tends to be reduced.

The acid to be present at the time of deflocculation may be added at the time of hydrolytic condensation. In the case where the acid has been lost as a result of removal of an alcohol formed as a by-product in the hydrolytic condensation, the acid is preferably added again so that the amount of the acid falls within the above-specified range.

When the deflocculation is carried out at a temperature of 40 to 200° C., the deflocculation can be completed in a short time with a moderate amount of the acid, and an alumina dispersion containing a desired size of particles and being excellent in viscosity stability can be produced. The deflocculation temperature less than 40° C. causes the deflocculation to require a long time, and thus is not preferable.

The deflocculation temperature more than 200° C. is not preferable either, since increasing the temperature beyond 200° C. requires a high-pressure resistant container or the like and is economically disadvantageous despite providing only a slight increase in deflocculation rate.

An alumina dispersion having a given concentration can be obtained by performing dilution with a solvent or concentration by heating as necessary after the completion of the deflocculation. In the case where heat concentration is performed, the heat concentration is preferably performed at 60° C. or less under reduced pressure in order to prevent viscosity increase or gelatinization.

Preferably, the metal oxide (A) to be mixed with the phosphorus compound (B) (or a composition including the phosphorus compound (B) when the phosphorus compound (B) is used in the form of a composition) is substantially devoid of phosphorus atoms. However, for example, a situation may arise where a small amount of phosphorus atoms are contained in the metal oxide (A) to be mixed with the phosphorus compound (B) (or a composition including the phosphorus compound (B) when the phosphorus compound (B) is used in the form of a composition) due to, for example, the influence of impurities present at the time of preparation of the metal oxide (A). Therefore, the metal oxide (A) to be mixed with the phosphorus compound (B) (or a composition including the phosphorus compound (B) when the phosphorus compound (B) is used in the form of a composition) may contain a small amount of phosphorus atoms to the extent that the effect of the present invention is not impaired. In terms of obtaining the multilayer structure that is more excellent in gas barrier properties, the content of phosphorus atoms contained in the metal oxide (A) to be mixed with the phosphorus compound (B) (or a composition including the phosphorus compound (B) when the phosphorus compound (B) is used in the form of a composition) is preferably 30 mol % or less, more preferably 10 mol % or less, even more preferably 5 mol % or less, and particularly preferably 1 mol % or less and may be 0 mol %, with respect to the number of moles (defined as 100 mol %) of the total metal atoms (M) contained in the metal oxide (A).

The layer (YA) included in the multilayer structure of the present invention has a particular structure in which the particles of the metal oxide (A) are bonded together via phosphorus atoms derived from the phosphorus compound (B). The shape and size of the particles of the metal oxide (A) in the layer (YA) may be the same as or different from the shape and size of the particles of the metal oxide (A) to be mixed with the phosphorus compound (B) (or a composition including the phosphorus compound (B) when the phosphorus compound (B) is used in the form of a composition). That is, the particles of the metal oxide (A) used as a raw material of the layer (YA) may change in shape or size during the process of formation of the layer (YA). Particularly, in the case where the layer (YA) is formed using the coating liquid (U) described later, the shape or size may change in the coating liquid (U), in the later-described liquid (S) usable for forming the coating liquid (U), or during the steps subsequent to the application of the coating liquid (U) onto the base (X).

[Phosphorus Compound (B)]

The phosphorus compound (B) contains a site capable of reacting with the metal oxide (A), and typically contains a plurality of such sites. In a preferred example, the phosphorus compound (B) contains 2 to 20 such sites (atomic groups or functional groups). Examples of such a site include a site capable of reacting with a functional group (e.g., hydroxyl group) present on the surface of the metal oxide (A). Examples of such a site include a halogen atom directly bonded to a phosphorus atom and an oxygen atom directly bonded to a phosphorus atom. Such a halogen or oxygen atom can undergo a condensation reaction (hydrolytic condensation reaction) with a hydroxyl group present on the surface of the metal oxide (A). The functional group (e.g., hydroxyl group) present on the surface of the metal oxide (A) is generally bonded to the metal atom (M) constituting the metal oxide (A).

For example, a phosphorous compound having a structure in which a halogen atom or an oxygen atom is directly bonded to a phosphorus atom can be used as the phosphorus compound (B). When such a phosphorus compound (B) is used, bond formation can be induced by (hydrolytic) condensation with hydroxyl groups present on the surface of the metal oxide (A). The phosphorus compound (B) may have one phosphorus atom or may have two or more phosphorus atoms.

The phosphorus compound (B) may be at least one compound selected from the group consisting of phosphoric acid, polyphosphoric acid, phosphorous acid, phosphonic acid, and derivatives thereof. Specific examples of the polyphosphoric acid include pyrophosphoric acid, triphosphoric acid, and polyphosphoric acid resulting from condensation of four or more phosphoric acid molecules. Examples of the derivatives include salts, (partial) esters, halides (chloride etc.), and dehydration products (diphosphorus pentoxide etc.), of phosphoric acid, polyphosphoric acid, phosphorous acid, and phosphonic acid. In addition, examples of the derivatives of phosphonic acid include: compounds (e.g., nitrilotris(methylenephosphonic acid) and N,N,N',N'-ethylenediaminetetrakis(methylenephosphonic acid)) in which a hydrogen atom directly bonded to a phosphorus atom of phosphonic acid (H—P(=O)(OH)$_2$) is substituted by an alkyl group that may have various types of functional groups; and salts, (partial) esters, halides, and dehydration products of such compounds. Furthermore, an organic polymer having a phosphorus atom, such as phosphorylated starch or the later-described polymer (E), can also be used as the phosphorus compound (B). One of these phosphorus compounds (B) may be used alone or two or more thereof may be used in combination. Among these phosphorus compounds (B), phosphoric acid is preferably used alone or in combination with another phosphorus compound, in terms of the stability of the later-described coating liquid (U) used for formation of the layer (YA) and in terms of more excellent gas barrier properties of the resulting multilayer structure.

As described above, the layer (YA) included in the multilayer structure of the present invention contains the reaction product (R), and the reaction product (R) is a reaction product formed by reaction at least between the metal oxide (A) and the phosphorus compound (B). Such a reaction product can be formed by mixing and reacting the metal oxide (A) with the phosphorus compound (B). The phosphorus compound (B) to be mixed with the metal oxide (A) (the phosphorus compound (B) immediately before mixing) may be the phosphorus compound (B) itself or may be in the form of a composition including the phosphorus compound (B), and is preferably in the form of a composition including the phosphorus compound (B). In a preferred example, the phosphorus compound (B) mixed with the metal oxide (A) is in the form of a solution obtained by dissolving the phosphorus compound (B) in a solvent. The solvent used can be of any type. Examples of a preferred solvent include water and a mixed solvent containing water.

In terms of obtaining the multilayer structure that is more excellent in gas barrier properties, the content of metal atoms in the phosphorus compound (B) or a composition including the phosphorus compound (B) which is to be mixed with the metal oxide (A) is preferably low. The content of metal atoms in the phosphorus compound (B) or a composition including the phosphorus compound (B) which is to be mixed with the metal oxide (A) is preferably 100 mol % or less, more preferably 30 mol % or less, even more preferably 5 mol % or less, and particularly preferably 1 mol % or less and may be 0 mol %, with respect to the number of moles (defined as 100 mol %) of the total phosphorus atoms contained in the phosphorus compound (B) or the composition including the phosphorus compound (B).

[Reaction Product (R)]

Examples of the reaction product (R) include a reaction product formed by reaction only between the metal oxide (A) and the phosphorus compound (B). Examples of the reaction product (R) also include a reaction product formed by reaction among the metal oxide (A), the phosphorus compound (B), and another compound. The reaction product (R) can be formed by a technique explained for the later-described production method.

[Ratio Between Metal Oxide (A) and Phosphorus Compound (B)]

In the layer (YA), the number of moles $N_M$ of the metal atoms constituting the metal oxide (A) and the number of moles $N_P$ of the phosphorus atoms derived from the phosphorus compound (B) preferably satisfy a relationship of $1.0 \leq$ (the number of moles $N_M$)/(the number of moles $N_P$)$\leq 3.6$, and more preferably satisfy a relationship of $1.1 \leq$ (the number of moles $N_M$)/(the number of moles $N_P$)$\leq 3.0$. If the value of (the number of moles $N_M$)/(the number of moles $N_P$) is more than 3.6, this means that the metal oxide (A) is excessive relative to the phosphorus compound (B). In this case, the bonding between the particles of the metal oxide (A) is insufficient while the amount of hydroxyl groups present on the surface of the metal oxide (A) is large, with the result that the gas barrier properties and the stability of gas barrier properties tend to be deteriorated. If the value of (the number of moles $N_M$)/(the number of moles $N_P$) is less than 1.0, this means that the phosphorus compound (B) is excessive relative to the metal oxide (A). In this case, the amount of the excess phosphorus compound (B) that is not involved in the bond to the metal oxide (A) is large while the amount of hydroxyl groups derived from the phosphorus compound (B) is likely to be large, with the same result that the gas barrier properties and the stability of gas barrier properties tend to be deteriorated.

The above ratio can be adjusted depending on the ratio between the amount of the metal oxide (A) and the amount of the phosphorus compound (B) in the coating liquid for forming the layer (YA). The ratio between the number of moles $N_M$ and the number of moles $N_P$ in the layer (YA) is generally a ratio in the coating liquid, and equal to the ratio between the number of moles of the metal atoms constituting the metal oxide (A) and the number of moles of the phosphorus atoms constituting the phosphorus compound (B).

[Polymer (C)]

The layer (YA) included in the multilayer structure of the present invention may further contain a particular polymer (C). The polymer (C) is a polymer having at least one functional group (f) selected from the group consisting of a hydroxyl group, a carboxyl group, a carboxylic acid anhydride group, and a salt of a carboxyl group. In the layer (YA) included in the multilayer structure, the polymer (C) may be directly or indirectly bonded to either or both the particle of the metal oxide (A) and the phosphorus atom derived from the phosphorus compound (B) through the functional group (f) of the polymer (C) itself. In the layer (YA) included in the multilayer structure, the reaction product (R) may have a polymer (C)-derived portion resulting, for example, from reaction of the polymer (C) with the metal oxide (A) or the phosphorus compound (B). In the present description, a polymer meeting the requirements for the phosphorus compound (B) and containing the functional group (f) is not categorized as the polymer (C), but is regarded as the phosphorus compound (B).

A polymer containing a structural unit having the functional group (f) can be used as the polymer (C). Specific examples of such a structural unit include structural units having one or more functional groups (f), such as a vinyl alcohol unit, an acrylic acid unit, a methacrylic acid unit, a maleic acid unit, an itaconic acid unit, a maleic anhydride unit, and a phthalic anhydride unit. The polymer (C) may contain only a single type of structural unit having the functional group (f) or may contain two or more types of structural units having the functional group (f).

In order to obtain the multilayer structure that has more excellent gas barrier properties and stability of gas barrier properties, the proportion of the structural unit having the functional group (f) in the total structural units of the polymer (C) is preferably 10 mol % or more, more preferably 20 mol % or more, even more preferably 40 mol % or more, and particularly preferably 70 mol % or more, and may be 100 mol %.

When the polymer (C) is constituted by the structural unit having the functional group (f) and another structural unit, the type of such another structural unit is not particularly limited. Examples of such another structural unit include: a structural unit derived from a (meth)acrylic acid ester, such as a methyl acrylate unit, a methyl methacrylate unit, an ethyl acrylate unit, an ethyl methacrylate unit, a butyl acrylate unit, and a butyl methacrylate unit; a structural unit derived from a vinyl ester, such as a vinyl formate unit and a vinyl acetate unit; a structural unit derived from an aromatic vinyl, such as a styrene unit and a p-styrenesulfonic acid unit; and a structural unit derived from an olefin, such as an ethylene unit, a propylene unit, and an isobutylene unit. When the polymer (C) contains two or more types of structural units, the polymer (C) may be an alternating copolymer, a random copolymer, a block copolymer, or a tapered copolymer.

Specific examples of the polymer (C) that has a hydroxyl group include polyvinyl alcohol, partially-saponified polyvinyl acetate, polyethylene glycol, polyhydroxyethyl (meth)acrylate, polysaccharides such as starch, and polysaccharide derivatives derived from polysaccharides. Specific examples of the polymer (C) that has a carboxyl group, a carboxylic acid anhydride group, or a salt of a carboxyl group include polyacrylic acid, polymethacrylic acid, poly(acrylic acid/methacrylic acid), and salts thereof. Specific examples of the polymer (C) that contains a structural unit devoid of the functional group (f) include ethylene-vinyl alcohol copolymer, ethylene-maleic anhydride copolymer, styrene-maleic anhydride copolymer, isobutylene-maleic anhydride alternating copolymer, ethylene-acrylic acid copolymer, and saponified ethylene-ethyl acrylate copolymer. In order to obtain the multilayer structure that has more excellent gas barrier properties and stability of gas barrier properties, the polymer (C) is preferably at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

The molecular weight of the polymer (C) is not particularly limited. In order to obtain the multilayer structure that has more excellent gas barrier properties and mechanical properties (drop impact resistance etc.), the number average molecular weight of the polymer (C) is preferably 5,000 or more, more preferably 8,000 or more, and even more preferably 10,000 or more. The upper limit of the number average molecular weight of the polymer (C) is not particularly specified, and is, for example, 1,500,000 or less.

In order to further improve the gas barrier properties, the content of the polymer (C) in the layer (YA) is preferably 50 mass % or less, more preferably 40 mass % or less, and even more preferably 30 mass % or less and may be 20 mass % or less, with respect to the mass of the layer (YA) (defined as 100 mass %). The polymer (C) may or may not react with another component in the layer (YA). In the present description, the polymer (C) having reacted with another component is also referred to as a polymer (C). For example, in the case where the polymer (C) is bonded to the metal oxide (A) and/or a phosphorus atom derived from the phosphorus compound (B), the reaction product is also referred to as a polymer (C). In this case, the above-described content of the polymer (C) is calculated by dividing the mass of the polymer (C) yet to be bonded to the metal oxide (A) and/or a phosphorus atom by the mass of the layer (YA).

The layer (YA) included in the multilayer structure may consist only of the reaction product (R) (including a reaction product having a polymer (C)-derived portion) formed by reaction between the metal oxide (A) containing at least aluminum and the phosphorus compound (B), may consist only of the reaction product (R) and the unreacted polymer (C), or may further contain another component.

Examples of the other component include: metal salts of inorganic acids, such as a metal carbonate, a metal hydrochloride, a metal nitrate, a metal hydrogen carbonate, a metal sulfate, a metal hydrogen sulfate, a metal borate, and a metal aluminate; metal salts of organic acids, such as a metal oxalate, a metal acetate, a metal tartrate, and a metal stearate; metal complexes such as a metal acetylacetonate complex (aluminum acetylacetonate etc.), a cyclopentadienyl metal complex (titanocene etc.), and a cyano metal complex; layered clay compounds; crosslinking agents; polymer compounds other than the polymer (C); plasticizers; antioxidants; ultraviolet absorbers; and flame retardants.

The content of the other component in the layer (YA) of the multilayer structure is preferably 50 mass % or less, more preferably 20 mass % or less, even more preferably 10 mass % or less, and particularly preferably 5 mass % or less, and may be 0 mass % (which means the other component is not contained).

[Thickness of Layer (YA)]

The thickness of the layer (YA) included in the multilayer structure of the present invention (or the total thickness of layers (YA) when the multilayer structure includes two or more layers (YA)) is preferably 4.0 µm or less, more preferably 2.0 µm or less, even more preferably 1.0 µm or less, and particularly preferably 0.9 µm or less. Thinning the layer (YA) can provide a reduction in the dimensional change of the multilayer structure during a process such as printing and lamination and also provide an increase in the pliability of the multilayer structure, thereby making it possible to allow the multilayer structure to have mechanical characteristics close to the mechanical characteristics of the base itself.

Even in the case where the total thickness of the layer(s) (YA) is 1.0 µm or less (e.g., 0.5 µm or less), the multilayer structure of the present invention can exhibit an oxygen transmission rate of 2 ml/(m²·day·atm) or less at 20° C. and 85% RH. The thickness of the layer (YA) (or the total thickness of layers (YA) when the multilayer structure includes two or more layers (YA)) is preferably 0.1 µm or more (e.g., 0.2 µm or more). In terms of further improving the gas barrier properties of the multilayer structure of the present invention, the thickness of a single layer (YA) is preferably 0.05 µm or more (e.g., 0.15 µm or more). The thickness of the layer (YA) can be controlled by the concentration of the later-described coating liquid (U) used for formation of the layer (YA) or by the method for application of the coating liquid (U).

[Layer (YB) and Layer (YC)]

The layer (Y) included in the multilayer structure of the present invention may be the layer (YB) which is a deposited layer of aluminum or the layer (YC) which is a deposited layer of aluminum oxide. These deposited layers can be formed by the same method as that for the later-described inorganic deposited layer.

[Layer (Z)]

The layer (Z) included in the multilayer structure of the present invention contains the polymer (E) having a plurality of phosphorus atoms. Forming the layer (Z) contiguous with the layer (Y) can provide a significant increase in the flexibility of the multilayer structure of the present invention.

[Polymer (E)]

The polymer (E) has a plurality of phosphorus atoms per macromolecule. In one example, the phosphorus atoms are contained in acid groups or derivatives thereof. Examples of the acid group containing a phosphorus atom include a phosphoric acid group, a polyphosphoric acid group, a phosphorous acid group, and a phosphonic acid group. At least one of the phosphorus atoms contained in the polymer (E) is involved with a site capable of reacting with the metal oxide (A). In a preferred example, the polymer (E) contains about 10 to 1000 such phosphorus atoms. Examples of the site involving the phosphorus atom and capable of reacting with the metal oxide (A) include the sites having structures described above for the phosphorus compound (B).

The polymer (E) is not particularly limited as long as it satisfies the above requirements. Preferred examples thereof include a homopolymer or copolymer of a vinylphosphonic acid compound containing a phosphoric acid group. The term "vinylphosphonic acid compound" as used herein refers to that which satisfies the requirements below.

(a) A substituted phosphonic acid, a substituted phosphinic acid, or an ester thereof.

(b) A carbon chain of the substituent is bonded to a phosphorus atom in the molecule (a phosphorus atom in a phosphonic acid group, phosphinic acid group, or ester thereof) via a phosphorus-carbon bond. A carbon-carbon double bond is present in the carbon chain. A part of the carbon chain may constitute a carbocyclic ring.

(c) At least one hydroxyl group is bonded to a phosphorus atom in the molecule (a phosphorus atom in a phosphonic acid group, phosphinic acid group, or ester thereof).

An example of the vinylphosphonic acid compound is a substituted phosphonic acid and/or phosphinic acid that satisfies the requirement (b). An example of the phosphinic acid compound is a substituted phosphonic acid that satisfies the requirement (b).

The number of carbon atoms contained in the carbon chain of the substituent bonded to the phosphorus atom may be in the range of 2 to 30 (e.g., in the range of 2 to 10). Examples of the substituent include hydrocarbon chains having a carbon-carbon double bond (e.g., a vinyl group, an allyl group, a 1-propenyl group, an isopropenyl group, a 2-methyl-1-propenyl group, a 2-methyl-2-propenyl group, a 1-butenyl group, a 2-butenyl group, a 3-butenyl group, a 1-pentenyl group, a 1-hexenyl group, a 1,3-hexadienyl group, and a 1,5-hexadienyl group). The hydrocarbon chain having a carbon-carbon double bond may contain one or more oxycarbonyl groups in the molecular chain. Examples of the carbocyclic ring include a benzene ring, a naphthalene ring, a cyclopropane ring, a cyclobutane ring, a cyclopentane ring, a cyclopropene ring, a cyclobutene ring, and a cyclopentene ring. In addition to the hydrocarbon chain having a carbon-carbon double bond in a carbocyclic ring, one or more saturated hydrocarbon chains (e.g., a methyl group, an ethyl group, and a propyl group) may be bonded. Examples of the substituent bonded to the phosphorus atom include: the above hydrocarbon chains having a carbon-carbon double bond such as a vinyl group; and carbocyclic rings, such as a 4-vinylbenzyl group, which include any of the above carbocyclic rings to which any of the above hydrocarbon chains is bonded.

The ester group constituting the ester has a structure in which the hydrogen atom of the hydroxyl group bonded to the phosphorus atom of phosphinic acid or phosphonic acid is substituted by an alkyl group. Examples of the alkyl group include a methyl group, an ethyl group, a propyl group, a butyl group, a pentyl group, and a hexyl group.

The polymer (E) can be obtained by polymerization of the vinylphosphonic acid compound as a monomer or by copolymerization of the vinylphosphonic acid compound as a monomer with another vinyl group-containing monomer. The polymer (E) can be obtained also by homopolymerization or copolymerization of a vinylphosphonic acid derivative such as a phosphonic acid halide or ester, followed by hydrolysis.

Examples of the vinylphosphonic acid compound that can be suitably used as a monomer in the present invention include: alkenylphosphonic acids such as vinylphosphonic acid and 2-propene-1-phosphonic acid; alkenyl aromatic phosphonic acids such as 4-vinylbenzyl phosphonic acid and 4-vinylphenyl phosphonic acid; phosphono(meth)acrylic acid esters such as 6-[(2-phosphonoacetyl)oxy]hexyl acrylate, phosphonomethyl methacrylate, 11-phosphonoundecyl methacrylate, and 1,1-diphosphonoethyl methacrylate; and phosphinic acids such as vinylphosphinic acid and 4-vinylbenzyl phosphinic acid. Among these monomers, vinylphosphonic acid is more preferable because poly(vinylphosphonic acid), which is a homopolymer of vinylphosphonic acid, can contribute to obtaining the multilayer structure excellent in flexibility. It should be noted that the monomers usable in the present invention are not limited to those mentioned above.

The polymer (E) of the present invention may be a homopolymer of the vinylphosphonic acid compound as a monomer, may be a copolymer formed by use of two or more of the vinylphosphonic acid compounds as monomers, or may be a copolymer of at least one of the vinylphosphonic acid compounds as a monomer and another vinyl monomer.

The other vinyl monomer that may be used in copolymerization with the above vinylphosphonic acid compounds as monomers is not particularly limited, and any commonly-known vinyl monomer copolymerizable with the above vinylphosphonic acid compounds can be used. Examples of such a vinyl monomer include acrylic acid, acrylic acid esters, methacrylic acid, methacrylic acid esters, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these vinyl monomers, methacrylic acid esters, acrylonitrile, styrenes, maleimide, and phenylmaleimide can be particularly preferably used.

In order to obtain the multilayer structure that has more excellent flexibility, the proportion of the structural unit derived from the vinylphosphonic acid compound as a monomer in the total structural units of the polymer (E) is preferably 10 mol % or more, more preferably 20 mol % or more, even more preferably 40 mol % or more, and particularly preferably 70 mol % or more, and may be 100 mol %.

The molecular weight of the polymer (E) is not particularly limited. Typically, the number average molecular weight of the polymer (E) is in the range of 1,000 to 100,000. When the number average molecular weight is within this range, both the improvement effect of stacking of the layer (Z) on the flexibility and the viscosity stability of the later-described coating liquid (V) containing the polymer (E) can be achieved high levels. When the weight of the polymer (E) per molecular moiety containing one phosphorus atom is in the range of 100 to 500, the improvement effect of stacking of the layer (Z) on the flexibility may be further increased.

The polymer (E) may be poly(vinylphosphonic acid) represented by the general formula (I) below.

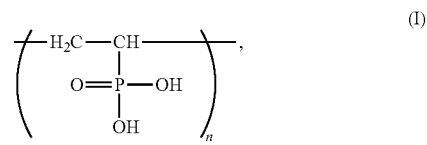

where n is a natural number.

The n is not particularly limited. The n is, for example, a number such that the number average molecular weight falls within the above-specified range.

The layer (Z) included in the multilayer structure may consist only of the polymer (E) having a plurality of phosphorus atoms or may further contain another component.

Examples of the other component include: metal salts of inorganic acids, such as a metal carbonate, a metal hydrochloride, a metal nitrate, a metal hydrogen carbonate, a metal sulfate, a metal hydrogen sulfate, and a metal borate; metal salts of organic acids, such as a metal oxalate, a metal acetate, a metal tartrate, and a metal stearate; metal complexes such as a metal acetylacetonate complex (magnesium acetylacetonate etc.), a cyclopentadienyl metal complex (titanocene etc.), and a cyano metal complex; layered clay compounds; crosslinking agents; polymer compounds other than the polymer (E); plasticizers; antioxidants; ultraviolet absorbers; and flame retardants.

The content of the other component in the layer (Z) of the multilayer structure is preferably 50 mass % or less, more preferably 20 mass % or less, even more preferably 10 mass % or less, and particularly preferably 5 mass % or less, or may be 0 mass % (which means the other component is not contained).

The polymerization reaction for forming the polymer (E) can be performed using a polymerization initiator in a solvent in which both the monomer component as a raw material and the polymer to be produced are soluble. Examples of the polymerization initiator include: azo initiators such as 2,2-azobisisobutyronitrile, 2,2-azobis(2,4-dimethylvaleronitrile), dimethyl 2,2-azobis(2-methylpropionate), dimethyl 2,2-azobisisobutyrate, and 2,2'-azobis(2-amidinopropane)dihydrochloride; and peroxide initiators such as lauryl peroxide, benzoyl peroxide, and tert-butyl peroctoate. When copolymerization is performed with another vinyl monomer, the solvent is selected as appropriate depending on the combination of the comonomers. Where necessary, a mixture of two or more solvents may be used.

In an example, the polymerization reaction is induced by adding a mixed solution containing a monomer, a polymerization initiator, and a solvent dropwise to a solvent at a polymerization temperature of 50 to 100° C., and is completed by performing stirring continuously for about 1 to 24 hours after the end of dropwise addition while maintaining a temperature that is equal to or higher than the polymerization temperature.

When the weight of the monomer component is defined as 1, the weight ratio of the solvent used is preferably about 0.1 to 3.0, and the weight ratio of the polymerization initiator used is preferably about 0.001 to 0.05. The more preferred weight ratio of the solvent is 0.1 to 2.5. When the amounts of the solvent and the polymerization initiator used fall outside the above ranges, there may arise problematic situations, such as where the polymer gelatinizes and becomes insoluble in various solvents, with the result that coating with a solution becomes impossible.

The layer (Z) included in the multilayer structure of the present invention can be formed by applying a solution of the polymer (E). Although any solvent may be used in the solution, examples of preferred solvents include water, alcohols, and mixed solvents thereof.

[Thickness of Layer (Z)]

The thickness of a single layer (Z) is preferably 0.005 μm or more, in terms of further improving the flexibility of the multilayer structure of the present invention. The upper limit of the thickness of the layer (Z) is not particularly specified; however, it is economically preferable to set the upper limit of the thickness of the layer (Z) at 1.0 μm because the improvement effect on the flexibility reaches a plateau when the thickness of the layer (Z) is increased above 1.0 μm. The thickness of the layer (Z) can be controlled by the concentration of the later-described coating liquid (V) used for forming the layer (Z) or by the method for application of the coating liquid (V).

[Base (X)]

The material of the base (X) included in the multilayer structure of the present invention is not particularly limited, and a base made of any of various materials can be used. Examples of the material of the base (X) include: resins such as thermoplastic resins and thermosetting resins; fiber assemblies such as fabric and paper; wood; glass; metals; and metal oxides. The base may have a composite configuration made of a plurality of materials or may have a multilayer configuration.

The form of the base (X) is not particularly limited. The base (X) may be a laminar base such as a film or a sheet, or may be any of various formed bodies having a three-dimensional shape such as a spherical shape, a polygonal shape, or a pipe shape. Among these, a laminar base is useful particularly when the multilayer structure (laminated structure) is used as a packaging material for packaging foods etc. or as a member for a solar cell.

Examples of the laminar base include a single-layer or multilayer base including at least one layer selected from the group consisting of a thermoplastic resin film layer, a thermosetting resin film layer, a fiber assembly sheet layer (a fabric layer, paper layer, or the like), a wood sheet layer, a glass layer, an inorganic deposited layer, and a metal foil layer. Among these, a base including at least one layer selected from the group consisting of a thermoplastic resin film layer, a paper layer, and an inorganic deposited layer is preferable. Such a base may be a single-layer base or a multilayer base. The multilayer structure (laminated structure) that uses such a base is excellent in processability into a packaging material and various characteristics required for use as a packaging material.

Examples of the thermoplastic resin film for forming the thermoplastic resin film layer include films obtained by subjecting the following thermoplastic resins to forming processes: polyolefin resins such as polyethylene and polypropylene; polyester resins such as polyethylene terephthalate, polyethylene-2,6-naphthalate, polybutylene terephthalate, and copolymers thereof; polyamide resins such as nylon-6, nylon-66, and nylon-12; hydroxyl group-containing polymers such as polyvinyl alcohol and ethylene-vinyl alcohol copolymer; polystyrene; poly(meth)acrylic acid ester; polyacrylonitrile; polyvinyl acetate; polycarbonate; polyarylate; regenerated cellulose; polyimide; polyetherimide; polysulfone; polyethersulfone; polyetheretherketone; and ionomer resins. As the base of the laminated structure used in a packaging material for packaging foods etc., a film made of polyethylene, polypropylene, polyethylene terephthalate, nylon-6, or nylon-66 is preferable.

The thermoplastic resin film may be an oriented film or a non-oriented film. In terms of excellent suitability for processes (such as printing and lamination) of the resulting multilayer structure, an oriented film, particularly a biaxially-oriented film, is preferable. The biaxially-oriented film may be a biaxially-oriented film produced by any one method selected from simultaneous biaxial stretching, sequential biaxial stretching, and tubular stretching.

Examples of paper used in the paper layer include kraft paper, high-quality paper, simili paper, glassine paper, parchment paper, synthetic paper, white paperboard, manila board, milk carton board, cup paper, and ivory paper. A multilayer structure for a paper container can be obtained by use of the base that includes the paper layer.

The inorganic deposited layer is preferably one that has barrier properties against oxygen gas and/or water vapor. A layer having transparency or a layer having light shielding properties, as exemplified by a deposited layer of metal such as aluminum, can be used as the inorganic deposited layer as appropriate. The inorganic deposited layer can be formed by vapor-depositing an inorganic substance onto a substrate, and the entire laminate including the substrate and the inorganic deposited layer formed on the substrate can be used as the base (X) that has a multilayer configuration. Examples of the inorganic deposited layer having transparency include: a layer formed of an inorganic oxide such as aluminum oxide, silicon oxide, silicon oxynitride, magnesium oxide, tin oxide, or a mixture thereof, a layer formed of an inorganic nitride such as silicon nitride or silicon carbonitride; and a layer formed of an inorganic carbide such as silicon carbide. Among these, a layer formed of aluminum oxide, silicon oxide, magnesium oxide, or silicon nitride is preferable in terms of excellent barrier properties against oxygen gas and/or water vapor.

The preferred thickness of the inorganic deposited layer varies depending on the types of the constituents of the inorganic deposited layer, but is generally in the range of 2 to 500 nm. A thickness that provides good barrier properties and mechanical properties to the multilayer structure may be selected within the range. If the thickness of the inorganic deposited layer is less than 2 nm, the repeatability of exhibition of the barrier properties of the inorganic deposited layer against oxygen gas and/or water vapor is likely to be reduced, and a situation may also arise where the inorganic deposited layer does not exhibit sufficient barrier properties. If the thickness of the inorganic deposited layer is more than 500 nm, the barrier properties of the inorganic deposited layer are likely to be deteriorated when the multilayer structure is pulled or bent. The thickness of the inorganic deposited layer is more preferably in the range of 5 to 200 nm, and even more preferably in the range of 10 to 100 nm.

Examples of the method for forming the inorganic deposited layer include vacuum deposition, sputtering, ion plating, and chemical vapor deposition (CVD). Among these, vacuum deposition is preferable in terms of productivity. A heating technique used for vacuum deposition is preferably any one technique selected from electron beam heating, resistive heating, and induction heating. In order to improve the denseness of the inorganic deposited layer and the adhesiveness of the inorganic deposited layer to the substrate on which it is formed, the deposition may be performed by employing plasma-assisted deposition or ion beam-assisted deposition. In order to increase the transparency of the inorganic deposited layer, reactive deposition in which a reaction is induced by blowing oxygen gas or the like may be employed for the deposition.

In the case where the base (X) is in laminar form, the thickness of the base (X) is preferably in the range of 1 to 1000 μm, more preferably in the range of 5 to 500 μm, and even more preferably in the range of 9 to 200 μm, in terms of good mechanical strength and processability of the resulting multilayer structure.

[Adhesive Layer (H)]

In the multilayer structure of the present invention, the layer (Y) and/or the layer (Z) may be stacked in direct contact with the base (X). Alternatively, the layer (Y) and/or the layer (Z) may be stacked over the base (X) with an adhesive layer (H) interposed between the base (X) and the layer (Y) and/or the layer (Z). With this configuration, the adhesion between the base (X) and the layer (Y) and/or the layer (Z) can be enhanced in some cases. The adhesive layer (H) may be formed of an adhesive resin. The adhesive layer (H) made of an adhesive resin can be formed by treating the surface of the base (X) with a commonly-known anchor coating agent or by applying a commonly-known adhesive onto the surface of the base (X). Preferred as the adhesive is a two-component reactive polyurethane adhesive composed of a polyisocyanate component and a polyol component which are to be mixed and reacted. There may be a case where the adhesion can be further enhanced by adding a small amount of additive such as a commonly-known silane coupling agent into the anchor coating agent, or the adhesive. Suitable examples of the silane coupling agent include a silane coupling agent having a reactive group such as an isocyanate group, an epoxy group, an amino group, a ureido group, or a mercapto group. Strong adhesion between the base (X) and the layer (Y) and/or the layer (Z) via the adhesive layer (H) makes it possible to more effectively prevent deterioration in the gas barrier properties and appearance of the multilayer structure of the present invention when the multilayer structure is subjected to a process such as printing or lamination.

Increasing the thickness of the adhesive layer (H) can enhance the strength of the multilayer structure of the present invention. However, when the adhesive layer (H) is too thick, the appearance tends to be deteriorated. The thickness of the adhesive layer (H) is preferably in the range of 0.03 to 0.18 μm. With this configuration, deterioration in the gas barrier properties and appearance of the multilayer structure of the present invention can be prevented more effectively when the multilayer structure is subjected to a process such as printing or lamination. Furthermore, the drop impact resistance of a packaging material using the multilayer structure of the present invention can be enhanced. The thickness of the adhesive layer (H) is more preferably in the range of 0.04 to 0.14 μm, and even more preferably in the range of 0.05 to 0.10 μm.

[Configuration of Multilayer Structure]

The multilayer structure (laminate) of the present invention may consist only of the base (X), the layer (Y), and the layer (Z) or may consist only of the base (X), the layer (Y), the layer (Z), and the adhesive layer (H). The multilayer structure of the present invention may include a plurality of layers (Y) and/or layers (Z). The multilayer structure of the present invention may further include another member (e.g., another layer such as a thermoplastic resin film layer, a paper layer, or an inorganic deposited layer) other than the base (X), the layer (Y), the layer (Z) and the adhesive layer (H). The multilayer structure of the present invention that has such another member (another layer or the like) can be produced, for example, by stacking the layer (Y) and the layer (Z) onto the base (X) directly or with the adhesive layer (H) interposed therebetween, and then by forming or adhering the other member (another layer or the like) onto the laminate directly or with an adhesive layer interposed therebetween. By having such another member (another layer or the like) included in the multilayer structure, the multilayer structure can be improved in its characteristics or endowed with additional characteristics. For example, heat-sealing properties can be imparted to the multilayer structure of the present invention, or its barrier properties or mechanical properties can be further improved.

In particular, by forming a layer of a polyolefin as an outermost layer of the multilayer structure of the present invention, heat-sealing properties can be imparted to the multilayer structure, or the mechanical characteristics of the multilayer structure can be improved. In terms of heat-sealing properties or improvement in mechanical characteristics, the polyolefin is preferably polypropylene or polyethylene. In addition, in order to improve the mechanical characteristics of the multilayer structure, at least one film selected from the group consisting of a film made of a polyester, a film made of a polyamide, and a film made of a hydroxyl group-containing polymer is preferably provided as another layer. In terms of improvement in mechanical characteristics, polyethylene terephthalate (PET) is preferable as the polyester, nylon-6 is preferable as the polyamide, and ethylene-vinyl alcohol copolymer is preferable as the hydroxyl group-containing polymer. Between the layers, an anchor coat layer or a layer made of an adhesive may be provided as necessary.

The multilayer structure of the present invention can be formed by stacking together at least one pair of the layer (Y) and the layer (Z) and at least another layer (including the base). Examples of the other layer include a polyester layer, a polyamide layer, a polyolefin layer (which may be a pigment-containing polyolefin layer, a heat-resistant polyolefin layer, or a biaxially-oriented heat-resistant polyolefin layer), a hydroxyl group-containing polymer layer (e.g., an ethylene-vinyl alcohol copolymer layer (which may be abbreviated as "EVOH layer" hereinafter)), a paper layer, an inorganic deposited film layer, a thermoplastic elastomer layer, and an adhesive layer. The number of these other layers, the number of the layers (Y), the number of the layers (Z), and the stacking order are not particularly limited as long as the multilayer structure includes the base, the layer (Y), and the layer (Z), and includes at least one pair of the layer (Y) and the layer (Z) that are contiguously stacked. A preferred example is a multilayer structure having a configuration including at least one set of the base (X), the layer (Y), and the layer (Z) that are stacked in order of base (X)/layer (Y)/layer (Z). The other layers may each be replaced by a formed body (formed body having a three-dimensional shape) that is made of the same material as the layer.

Specific examples of the configuration of the multilayer structure of the present invention are listed below. In the specific examples listed below, each of the layers may be replaced by a formed body (formed body having a three-dimensional shape) that is made of the same material as the layer. Although the multilayer structure may have an adhesive layer as exemplified by the adhesive layer (H), such an adhesive layer is omitted in the specific examples listed below. In the following description, "layer (YZ)" refers to a structure composed of the layer (Y) and the layer (Z) stacked contiguously, and the order of arrangement may be the order of layer (Y)/layer (Z) or layer (Z)/layer (Y).

(1) Layer (YZ)/polyester layer,
(2) Layer (YZ)/polyester layer/layer (YZ),
(3) Layer (YZ)/polyamide layer,
(4) Layer (YZ)/polyamide layer/layer (YZ),
(5) Layer (YZ)/polyolefin layer,
(6) Layer (YZ)/polyolefin layer/layer (YZ),
(7) Layer (YZ)/hydroxyl group-containing polymer layer,
(8) Layer (YZ)/hydroxyl group-containing polymer layer/layer (YZ),
(9) Layer (YZ)/paper layer,
(10) Layer (YZ)/paper layer/layer (YZ),
(11) Layer (YZ)/inorganic deposited layer/polyester layer,
(12) Inorganic deposited layer/layer (YZ)/polyester layer,
(13) Layer (YZ)/inorganic deposited layer/polyamide layer,
(14) Inorganic deposited layer/layer (YZ)/polyamide layer,
(15) Layer (YZ)/inorganic deposited layer/polyolefin layer,
(16) Inorganic deposited layer/layer (YZ)/polyolefin layer,
(17) Layer (YZ)/inorganic deposited layer/hydroxyl group-containing polymer layer,
(18) Inorganic deposited layer/layer (YZ)/hydroxyl group-containing polymer layer,
(19) Layer (YZ)/polyester layer/polyamide layer/polyolefin layer,
(20) Layer (YZ)/polyester layer/layer (YZ)/polyamide layer/polyolefin layer,
(21) Polyester layer/layer (YZ)/polyamide layer/polyolefin layer,
(22) Layer (YZ)/polyamide layer/polyester layer/polyolefin layer,
(23) Layer (YZ)/polyamide layer/layer (YZ)/polyester layer/polyolefin layer,
(24) Polyamide layer/layer (YZ)/polyester layer/polyolefin layer,
(25) Layer (YZ)/polyolefin layer/polyamide layer/polyolefin layer,
(26) Layer (YZ)/polyolefin layer/layer (YZ)/polyamide layer/polyolefin layer,
(27) Polyolefin layer/layer (YZ)/polyamide layer/polyolefin layer,
(28) Layer (YZ)/polyolefin layer/polyolefin layer,
(29) Layer (YZ)/polyolefin layer/layer (YZ)/polyolefin layer,
(30) Polyolefin layer/layer (YZ)/polyolefin layer,
(31) Layer (YZ)/polyester layer/polyolefin layer,
(32) Layer (YZ)/polyester layer/layer (YZ)/polyolefin layer,
(33) Polyester layer/layer (YZ)/polyolefin layer,
(34) Layer (YZ)/polyamide layer/polyolefin layer,
(35) Layer (YZ)/polyamide layer/layer (YZ)/polyolefin layer,
(36) Polyamide layer/layer (YZ)/polyolefin layer,
(37) Layer (YZ)/polyester layer/paper layer,
(38) Layer (YZ)/polyamide layer/paper layer,
(39) Layer (YZ)/polyolefin layer/paper layer,
(40) Polyolefin layer/paper layer/polyolefin layer/layer (YZ)/polyester layer/polyolefin layer,
(41) Polyolefin layer/paper layer/polyolefin layer/layer (YZ)/polyamide layer/polyolefin layer,
(42) Polyolefin layer/paper layer/polyolefin layer/layer (YZ)/polyolefin layer,
(43) Paper layer/polyolefin layer/layer (YZ)/polyester layer/polyolefin layer,
(44) Polyolefin layer/paper layer/layer (YZ)/polyolefin layer,
(45) Paper layer/layer (YZ)/polyester layer/polyolefin layer,
(46) Paper layer/layer (YZ)/polyolefin layer,
(47) Layer (YZ)/paper layer/polyolefin layer,
(48) Layer (YZ)/polyester layer/paper layer/polyolefin layer,
(49) Polyolefin layer/paper layer/polyolefin layer/layer (YZ)/polyolefin layer/hydroxyl group-containing polymer layer,
(50) Polyolefin layer/paper layer/polyolefin layer/layer (YZ)/polyolefin layer/polyamide layer, and
(51) Polyolefin layer/paper layer/polyolefin layer/layer (YZ)/polyolefin layer/polyester layer.

According to the present invention, a multilayer structure that possesses one or both of the features listed below can be obtained. In a preferred example, the multilayer structure in which the thickness of the layer (Y) (or the total thickness of layers (Y) when the multilayer structure includes two or more layers (Y)) is 2.0 µm or less (e.g., 0.01 µm or more and 2.0 µm or less) possesses the features listed below. The details of the conditions for the measurement of the oxygen transmission rate will be described later in EXAMPLES.

(Feature 1) The oxygen transmission rate at 20° C. and 85% RH is 2 ml/(m²·day·atm) or less.

(Feature 2) The oxygen transmission rate at 20° C. and 85% RH is 4 ml/(m²·day·atm) or less as measured after the multilayer structure is kept stretched by 5% at 23° C. and 50% RH for 5 minutes.

[Applications]

The multilayer structure of the present invention is excellent in gas barrier properties, and can maintain the gas barrier properties at a high level even when subjected to physical stresses such as deformation and impact. Furthermore, according to the present invention, the multilayer structure obtained can have excellent appearance. Therefore, the multilayer structure of the present invention can be used in various applications. For example, a product including the multilayer structure of the present invention may be a product including the multilayer structure as a packaging material or as a member of an electronic device such as a solar cell, a display, or a lighting device. The packaging material may be a formed product, and may be in the form of a bag. The member of the electronic device is, for example, a protective sheet for protecting the surface of the body of the electronic device. The multilayer structure of the present invention can be endowed with barrier properties against water vapor as well as the gas barrier properties and, in this case, can maintain the water vapor barrier properties at a high level even when subjected to physical stresses such as deformation and impact. Particularly, when the multilayer structure is used in a product such as a solar cell member or a display member, these characteristics may make a great contribution to the durability of the product.

The multilayer structure of the present invention is particularly preferably used as a packaging material. Examples of applications other than the use as a packaging material include uses as or in an electronic device-related member, a member for optical communication, a flexible film for electronic equipment, a barrier membrane for fuel cells, a sealing film for fuel cells, and a substrate film for various functional films, and examples of the electronic device-related member include: display members such as a substrate film for LCDs, a substrate film for organic EL devices, a substrate film for electronic paper, a sealing film for electronic devices, and a film for PDPs; a film for LEDs; a film for IC tags; a solar cell module; and solar cell members such as a back sheet for solar cells, and a protective film for solar cells. When the multilayer structure is used as a display member, it is used, for example, as a low-reflection film.

The packaging material can be used in various applications, and is preferable for applications in which barrier properties against oxygen are required and for applications in which the air inside the packaging material is replaced by any of various functional gases. For example, the packaging material of the present invention is used preferably as a food packaging material. When used as a food packaging material, the packaging material is suitably used particularly in a form having a fold line, such as in the form of a stand-up pouch. In addition, the packaging material of the present invention can be used preferably not only as a food packaging material but also as a packaging material for packaging: chemicals such as agrochemicals and pharmaceuticals; medical devices; industrial materials such as machinery components and delicate materials; and garments.

The packaging material of the present invention can be used by being processed into various formed products. Such a formed product may be a formed container, a vertical form fill seal bag, a vacuum packaging bag, a pouch such as a spouted pouch, a laminated tube container, an infusion bag, a container lid, a paper container, or a vacuum insulator. These packaging materials have a separation barrier separating the interior for holding contents from the outside, and this separation barrier includes the multilayer structure of the present invention.

The formed container includes: a base formed beforehand in a predetermined shape, particularly a shape defining an interior (internal space) for holding the contents; and a gas barrier coating formed on the base. The base and the gas barrier coating constitute the separation barrier. The formed container typically has the shape of a bottle, tank, or the like. The base is generally formed so as to have an opening for introducing the contents into the internal space.

The vertical form fill seal bag is one obtained by forming a film material into the shape of a bag using a vertical form fill seal machine (also called a vertical form fill seal packaging machine). For example, the vertical form fill seal machine holds the fed film material in a manner in which the film material has two opposing faces, seals (joins) their side edges and bottom edges so as to form an open-top bag, and feed the contents from above to fill the interior of the bag. Subsequently, the vertical form fill seal machine seals the top of the bag, cut its top edge, and discharge the bag in the form of a vertical form fill seal bag. The vertical form fill seal machine allows hygienic, efficient bag making which requires less human intervention. Various methods can be used for bag making by a vertical form fill seal machine. In any method, the contents are fed through the top opening of the bag into its interior, and then the opening is sealed to produce the vertical form fill seal bag. In the vertical form fill seal bag, the film material includes the multilayer structure and constitutes the separation barrier.

The vacuum packaging bag is a bag used in a state where its interior is under reduced pressure. In the vacuum packaging bag, due to the interior of the bag being under reduced pressure, the film material separating the interior of the bag from the outside of the bag is generally deformed so as to be in contact with the contents held in the bag. The contents typically consist of a food such as corn on the cob, bean, bamboo shoot, potato, chestnut, tea leaf, meet, fish, or confectionery. In the vacuum packaging bag, the film material includes the multilayer structure and constitutes the separation barrier.

The pouch is a container including a film material as a separation barrier separating the container's interior holding the contents from the outside. The pouch is suitable for holding the contents in liquid or slurry form, and can be used also for holding the contents in solid form. The contents typically consist of a beverage, a seasoning agent, a food such as a liquid food, or a daily commodity such as a detergent or a liquid soap. A spouted pouch includes a main body formed by use of a film material and a lidded spout attached to the top of the main body. A zippered pouch is also known which includes, instead of the lidded spout, a sealing zipper in an edge portion of the main body. A pouch having a bottom wall endowing the pouch with the self-standing ability is called a stand-up pouch (standing pouch). A gusseted pouch having a gusset has also been manufactured. A flat pouch is produced by using a film material having sealing portions at its edges and joining the sealing portions together. The flat pouch may be one in which two film materials are joined together at their respective four edges or in which one film material folded has its three edges sealed.

The laminated tube container includes: a barrel portion including a laminated film as a separation barrier separating the interior of the container from the outside; and an outlet portion for discharging the contents held in the interior of the container. The barrel portion of the laminated tube container, for example, has the shape of a tube having one end closed, and the outlet portion is provided at the other end of the barrel portion. In the laminated tube container, the laminated film material (film material) includes the multilayer structure.

The infusion bag is a bag for holding, as contents, an infusion such as an amino acid infusion, an electrolyte infusion, a carbohydrate infusion, or a fat emulsion for infusions. The infusion bag may include a plug member in addition to a bag body holding the contents. Also, the infusion bag may have a hanging hole for hanging the bag. In the infusion bag, a film material separating the bag's interior for holding an infusion from the outside includes the multilayer structure.

The container lid includes a film material which, in a container formed by combining the container lid with a container body, functions as a part of a separation barrier separating the interior of the container from the outside of the container. The container lid is combined with a container body having an opening by heat sealing or joining (sealing) using an adhesive so as to close the opening, and thus a container (lidded container) having a hermetically-closed internal space is formed. The container lid is generally joined to the container body at its edges. In this case, the central portion of the cover surrounded by the edges faces the internal space of the container. The container body is a formed body having, for example, a cup shape, a tray shape, or another shape, and includes a flange portion for sealing of the container lid, a wall portion, etc.

The paper container is a container having a separation barrier separating the container's interior holding contents from the outside, the separation barrier including a paper layer. The paper container, for example, has a shape of the gable top type or the brick type. These shapes have a bottom wall for allowing the self-standing of the paper container.

The vacuum insulator is a heat insulator including a sheath material and a core material placed in an interior bounded by the sheath material, the interior, in which the core material is placed, being under reduced pressure. For example, a powder such as perlite powder, a fiber material such as glass wool, foamed resin such as urethane foam, a hollow container, a honeycomb structure, or the like, can be used as the core material. In the vacuum insulator, the sheath material functioning as a separation barrier includes the multilayer structure.

For the formed product (e.g., the vertical form fill seal bag), heat sealing is performed in some cases. In the case where heat sealing is performed, it is generally necessary to dispose a heat-sealable layer on a side corresponding to the inner side of the formed product or on both sides corresponding to the inner side and outer side of the formed product. When the heat-sealable layer is provided only on a side corresponding to the inner side of the formed product (bag), the body portion of the formed product is generally sealed with a fin seal. When the heat-sealable layer is provided on both sides corresponding to the inner side and outer side of the formed product, the body portion is generally sealed with a lap seal. A polyolefin layer (which may be referred to as "PO layer" hereinafter) is preferable as the heat-sealable layer.

A product including the multilayer structure of the present invention may be an electronic device provided with a protective sheet. This product includes an electronic device main body and a protective sheet protecting a surface of the electronic device main body. This electronic device may include an electronic device main body, a sealing material for sealing the electronic device main body, and a protective sheet for protecting a surface of the electronic device main body. The sealing material covers the entire surfaces of the electronic device main body 1. In this case, the protective sheet is provided over at least one surface of the electronic device main body, with the sealing material interposed therebetween. Also over the opposite surface of the electronic device main body, there may be provided the protective sheet, with the sealing material interposed between the opposite surface and the protective sheet. The electronic device main body is not particularly limited, and examples thereof include: a photoelectric conversion device such as a solar cell; an information display device such as an organic EL display, a liquid crystal display, or electronic paper; and a lighting device such as an organic EL light emitting device. The sealing material is a member arbitrarily added depending on the type and intended use of the electronic device main body. EVA (ethylene-vinyl acetate resin), PVB (polyvinyl butyral), or the like, is used in the sealing material.

Hereinafter, a multilayer film including the base (X) and the layer (YZ) stacked on the base (X) may be referred to as a multilayer barrier film. This multilayer barrier film is also one type of the multilayer structure of the present invention. Layers for imparting various characteristics (e.g., heat sealing properties) may be stacked to the multilayer barrier film. For example, the multilayer structure of the present invention may have a configuration of multilayer barrier film/adhesive layer/polyolefin layer or a configuration of polyolefin layer/adhesive layer/multilayer barrier film/adhesive layer/polyolefin layer. That is, the multilayer structure of the present invention may include a polyolefin layer disposed on one of the outermost surfaces. In addition, the multilayer structure of the present invention may include a first polyolefin layer disposed on one of the outermost surfaces and a second polyolefin layer disposed on the other outermost surface. The first polyolefin layer and the second polyolefin layer may be the same or different.

The vertical form fill seal bag may be formed by stacking together at least one multilayer barrier film and at least another layer. Examples of the other layer include a polyester layer, a polyamide layer, a polyolefin layer, a paper layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the multilayer structure for the vertical form fill seal bag include a configuration of multilayer barrier film/polyamide layer/PO layer, a configuration of multilayer barrier film/PO layer, and a configuration of PO layer/multilayer barrier film/PO layer. In these configurations, for example, a polyamide film can be used as the base of the multilayer barrier film. The vertical form fill seal bag can maintain its gas barrier properties even when subjected to physical stresses such as deformation and impact. Adhesive layers may be provided between the layers constituting the vertical form fill seal bag. In the case where the layer (YZ) of the multilayer structure of the present invention lies on one surface of the base, the layer (YZ) may face either outwardly or inwardly of the vertical form fill seal bag.

The formed product including the multilayer structure of the present invention may be a vacuum packaging bag for packaging solid-containing foods etc. The vacuum packaging bag is excellent in gas barrier properties, and can maintain its gas barrier properties even when subjected to physical stresses such as deformation and impact. Therefore, the vacuum packaging bag undergoes little deterioration in gas barrier properties over a long period of time. The vacuum packaging bag is flexible, and closely adheres to solid-containing foods easily, so that degassing at the time of vacuum packaging is easy. Therefore, the vacuum packaging bag allows reduction in the amount of residual oxygen in the vacuum packaged product, and is thus excellent in long-term food storage performance. In addition, since angulated portions or creased portions are relatively unlikely to be formed after vacuum packaging, defects such as pin holes and cracks are relatively unlikely to occur. Furthermore, with the vacuum packaging bag, the occurrence of pin holes due to friction between the vacuum packaging bags or between the vacuum packaging bag and a cardboard can be prevented. Moreover, since the vacuum packaging bag is excellent in gas barrier properties and can maintain its gas barrier properties even when subjected to physical stresses such as deformation and impact, the vacuum packaging bag can prevent quality degradation of the contents (e.g., a food) over a long period of time.

The vacuum packaging bag may be formed by stacking together at least one multilayer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the multilayer structure for the vacuum packaging bag include a configuration of multilayer barrier film/polyamide layer/PO layer and a configuration of polyamide layer/multilayer barrier film/PO layer. In these configurations, for example, a polyamide film can be used as the base of the multilayer barrier film. The vacuum packaging bag using such a multilayer structure is excellent particularly in the gas barrier properties exhibited after vacuum packaging or after vacuum packaging and heat sterilization. Adhesive layers may be provided between the above layers. In the case where the layer (YZ) is stacked only on one surface of the base, the layer (YZ) may be located outwardly or inwardly of the base in the vacuum packaging bag.

The formed product including the multilayer structure of the present invention may be a spouted pouch for packaging various liquid substances. The spouted pouch can be used as a container for liquid beverages (e.g., soft drinks), jelly drinks, yogurts, fruit sauces, seasoning agents, functional water, liquid foods, etc. Also, the spouted pouch can be preferably used as a container for liquid medical products such as amino acid infusions, electrolyte infusions, carbohydrate infusions, and fat emulsions for infusions. The spouted pouch is excellent in gas barrier properties, and can maintain its gas barrier properties even when subjected to physical stresses such as deformation and impact. Therefore, the use of the spouted pouch makes it possible to prevent the contents from being altered after transportation and after long-term storage. In addition, since the spouted pouch has good transparency, it is easy to identify the contents or to check for alteration of the contents caused by degradation.

The spouted pouch may be formed by stacking together at least one multilayer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the multilayer structure for the spouted pouch include a configuration of multilayer barrier film/polyamide layer/PO layer and a configuration of polyamide layer/multilayer barrier film/PO layer. Adhesive layers may be provided between the above layers. In the case where the layer (YZ) is stacked only on one surface of the base, the layer (YZ) may be located outwardly or inwardly of the base in the spouted pouch.

The formed product including the multilayer structure of the present invention may be a laminated tube container for packaging cosmetics, chemicals, medical products, foods, dentifrices, etc. The laminated tube container is excellent in gas barrier properties, and can maintain its gas barrier properties even when subjected to physical stresses such as deformation and impact. In addition, since the laminated tube container has good transparency, it is easy to identify the contents or to check for alteration of the contents caused by degradation.

The laminated tube container may be formed by stacking together at least one multilayer barrier film and at least another layer. Examples of the other layer include a polyamide layer, a polyolefin layer (which may be a pigment-containing polyolefin layer), an inorganic deposited film layer, an EVOH layer, and an adhesive layer. The number and stacking order of these layers are not particularly limited. In the case where heat sealing is performed, a configuration adapted for that purpose is employed.

Particularly preferred configurations for the laminated tube container include a configuration of PO layer/multilayer barrier film/PO layer and a configuration of PO layer/pigment-containing PO layer/PO layer/multilayer barrier film/PO layer. Adhesive layers may be disposed between the above layers. In the case where the layer (YZ) is stacked only on one surface of the base, the layer (YZ) may be located outwardly or inwardly of the base in the laminated tube container.

The formed product including the multilayer structure of the present invention may be an infusion bag, and may be, for example, an infusion bag to be filled with a liquid medical product such as an amino acid infusion, an electrolyte infusion, a carbohydrate infusion, or a fat emulsion for infusions. The infusion bag is excellent in gas barrier properties, and can maintain its gas barrier properties even when subjected to physical stresses such as deformation and impact. Therefore, with the infusion bag, it is possible to prevent the packed liquid medical product from being altered before, during and after heat sterilization, after transportation, and after storage.

The infusion bag may be formed by stacking together at least one multilayer barrier film and at least another layer. Examples of the other layer include a polyamide layer, a polyolefin layer, an inorganic deposited film layer, an EVOH layer, a thermoplastic elastomer layer, and an adhesive layer. The number and stacking order of these layers are not particularly limited. In the case where heat sealing is performed, a configuration adapted for that purpose is employed.

Particularly preferred configurations of the multilayer structure for the infusion bag include a configuration of multilayer barrier film/polyamide layer/PO layer and a configuration of polyamide layer/multilayer barrier film/PO layer. Adhesive layers may be disposed between the above layers. In the case where the layer (YZ) is stacked only on one surface of the base, the layer (YZ) may be located outwardly or inwardly of the base in the infusion bag.

The formed product including the multilayer structure of the present invention may be a cover of a container to be filled with a food such as a processed meat product, a processed vegetable product, a processed seafood product, or a fruit. The container lid is excellent in gas barrier properties, and can maintain its gas barrier properties even when subjected to physical stresses such as deformation and impact. Therefore, quality degradation of the contained food can be prevented over a long period of time. The container lid is used preferably as a cover of a container used for storage of the contents such as a food stuff.

The container lid may be formed by stacking together at least one multilayer barrier film and at least another layer. Examples of the other layer include a polyamide layer, a polyolefin layer, an inorganic deposited film layer, an EVOH layer, a polyester layer, a paper layer, and an adhesive layer. The number and stacking order of these layers are not particularly limited. In the case where heat sealing is performed, a configuration adapted for that purpose is employed.

Particularly preferred configurations of the multilayer structure for the container lid include a configuration of multilayer barrier film/polyamide layer/PO layer and a configuration of multilayer barrier film/PO layer. In these configurations, for example, a polyamide film can be used as the base of the multilayer barrier film. Adhesive layers may be provided between the above layers. In the case where the layer (YZ) lies on one surface of the base, the layer (YZ) may be located inwardly of the base (on the container side) or outwardly of the base.

The formed product including the multilayer structure of the present invention may be a paper container. The paper container undergoes only slight deterioration in gas barrier properties even when subjected to a folding process. The paper container is used preferably as a container with a window by virtue of the good transparency of the layer (YZ). Furthermore, the paper container is suitable for heating by a microwave oven.

The paper container may be formed by stacking together at least one multilayer barrier film and at least another layer. Examples of the other layer include a polyester layer, a polyamide layer, a polyolefin layer (which may be a heat-resistant polyolefin layer or a biaxially-oriented heat-resistant polyolefin layer), an inorganic deposited film layer, a hydroxyl group-containing polymer layer, a paper layer, and an adhesive layer. The number and stacking order of these layers are not particularly limited. In the case where heat sealing is performed, a configuration adapted for that purpose is employed.

Particularly preferred configurations of the multilayer structure for the paper container include a configuration of heat-resistant polyolefin layer/paper layer/heat-resistant polyolefin layer/multilayer barrier film/heat-resistant polyolefin layer. Adhesive layers may be disposed between the above layers. In the above example, the heat-resistant polyolefin layers consist of, for example, either biaxially-oriented heat-resistant polyolefin films or non-oriented heat-resistant polyolefin films. In terms of ease of the forming process, the heat-resistant polyolefin layers disposed as the outermost layers of the multilayer structure are preferably non-oriented polypropylene films. Similarly, the heat-resistant polyolefin layer disposed inwardly of the outermost layers of the multilayer structure is preferably a non-oriented polypropylene film. In a preferred example, all the heat-resistant polyolefin layers included in the multilayer structure are non-oriented polypropylene films.

The formed product including the multilayer structure of the present invention may be a vacuum insulator that can be used in various applications requiring cold keeping or warm keeping. The vacuum insulator can maintain heat insulating effect over a long period of time, and thus can be used, for example, as or in: a heat insulating material for home electric appliances such as refrigerators, hot-water supply systems, and rice cookers; a residential heat insulating material used in walls, ceilings, attics, floors, etc.; a vehicle roof member; and an insulating panel of automatic vending machines etc.

The vacuum insulator may be formed by stacking together at least one multilayer barrier film and at least another layer. Examples of the other layer include a polyester layer, a polyamide layer, a polyolefin layer, and an adhesive layer. The number and stacking order of these layers are not particularly limited. In the case where heat sealing is performed, a configuration adapted for that purpose is employed.

Particularly preferred configurations of the multilayer structure for the vacuum insulator include a configuration of multilayer barrier film/polyamide layer/PO layer and a configuration of polyamide layer/multilayer barrier film/PO layer. Adhesive layers may be provided between the above layers. In the case where the layer (YZ) is stacked only on one surface of the base, the layer (YZ) may be located outwardly or inwardly of the base in the vacuum insulator.

[Method for Producing Multilayer Structure]

Hereinafter, a method of the present invention for producing a multilayer structure will be described. With this method, the multilayer structure of the present invention can easily be produced. The materials used in the method of the present invention for producing a multilayer structure, and the configuration of the multilayer structure, are the same as those mentioned above. Therefore, redundant descriptions are omitted in some cases. For example, the foregoing descriptions about the multilayer structure of the present invention hold true for the base (X), the layer (Y), the layer (Z), the metal oxide (A), the phosphorus compound (B), the polymer (C), and the polymer (E). The matters described for the production method can be applied to the multilayer structure of the present invention. The matters described for the multilayer structure of the present invention can be applied to the production method of the present invention.

The production method of the present invention is a method for producing a multilayer structure including at least one base (X), at least one layer (Y), and at least one layer (Z). The layer (Y) contains an aluminum atom. The layer (Z) contains the polymer (E) having a plurality of phosphorus atoms. The multilayer structure includes at least one pair of the layer (Y) and the layer (Z) that are contiguously stacked. The production method of the present invention includes a step (IV) of applying a coating liquid (V) containing the polymer (E) having a plurality of phosphorus atoms so as to form the layer (Z).

The cases where the layer (Y) included in the multilayer structure of the present invention is the layer (YB) which is a deposited layer of aluminum or the layer (YC) which is a deposited layer of aluminum oxide will not be described in detail since the layer (YB) and the layer (YC) can be formed by any of the common deposition methods mentioned above. The following will describe in detail particularly the case where the layer (Y) included in the multilayer structure of the present invention is the layer (YA) containing the reaction product (R) formed by reaction between the metal oxide (A) containing at least aluminum and the phosphorus compound (B). As for the method for forming the layer (Z) (the step (IV) described later), the same method can be employed in any case where the layer (Y) is the layer (YA), the layer (YB), or the layer (YC).

In the case where the layer (Y) included in the multilayer structure of the present invention is the layer (YA) containing the reaction product (R) formed by reaction between the metal oxide (A) containing at least aluminum and the phosphorus compound (B), the multilayer structure production method of the present invention includes the steps (I), (II), (III), and (IV). In the step (I), the metal oxide (A) containing at least aluminum, at least one compound containing a site capable of reacting with the metal oxide (A), and a solvent are mixed so as to prepare a coating liquid (U) containing the metal oxide (A), the at least one compound, and the solvent. In the step (II), the coating liquid (U) is applied onto the base (X) to form a precursor layer of the layer (YA) on the base (X). In the step (III), the precursor layer is heat-treated at a temperature of 110° C. or more to form the layer (YA) on the base (X). In the step (IV), the coating liquid (V) containing the polymer (E) having a plurality of phosphorus atoms is applied to form the layer (Z). Typically, the steps (I), (II), (III), and (IV) are carried out in this order; however, when the layer (Z) is formed between the base (X) and the layer (YA), the step (IV) may be carried out before the step (II). Also, the step (III) can be carried out after the step (IV) as described later.

[Step (I)]

The at least one compound containing a site capable of reacting with the metal oxide (A), which is used in the step (I), may be referred to as "at least one compound (Z)" hereinafter. The step (I) includes, at least, mixing the metal oxide (A), the at least one compound (Z), and the solvent. In one aspect, a raw material containing the metal oxide (A) and the at least one compound (Z) is subjected to reaction in the solvent in the step (I). The raw material may contain another compound in addition to the metal oxide (A) and the at least one compound (Z). Typically, the metal oxide (A) is mixed in the form of particles.

In the coating liquid (U), the number of moles $N_M$ of the metal atoms (M) constituting the metal oxide (A) and the number of moles $N_P$ of the phosphorus atoms contained in the phosphorus compound (B) satisfy a relationship of $1.0 \leq$ (the number of moles $N_M$)/(the number of moles $N_P$)$\leq 3.6$. The preferred range of the value of (the number of moles $N_M$)/(the number of moles $N_P$) has previously been indicated, and therefore is not redundantly described.

The at least one compound (Z) includes the phosphorus compound (B). The number of moles of metal atoms contained in the at least one compound (Z) is preferably in the range of 0 to 1 times the number of moles of phosphorus atoms contained in the phosphorus compound (B). Typically, the at least one compound (Z) is a compound containing a plurality of sites capable of reacting with the metal oxide (A), and the number of moles of metal atoms contained in the at least one compound (Z) is in the range of 0 to 1 times the number of moles of phosphorus atoms contained in the phosphorus compound (B).

When the ratio, (the number of moles of metal atoms contained in the at least one compound (Z))/(the number of moles of phosphorus atoms contained in the phosphorus compound (B)), is adjusted in the range of 0 to 1 (e.g., in the range of 0 to 0.9), a multilayer structure that has more excellent gas barrier properties can be obtained. In order to further improve the gas barrier properties of the multilayer structure, the ratio is preferably 0.3 or less, more preferably 0.05 or less, and even more preferably 0.01 or less, and may be 0. Typically, the at least one compound (Z) consists only of the phosphorus compound (B). In the step (I), the ratio can easily be lowered.

The step (I) preferably includes the following steps (a) to (c).

Step (a): Step of preparing a liquid (S) containing the metal oxide (A)

Step (b): Step of preparing a solution (T) containing the phosphorus compound (B)

Step (c): Step of mixing the liquid (S) and the solution (T) obtained in the steps (a) and (b)

The step (b) may be performed prior to, simultaneously with, or subsequent to the step (a). Hereinafter, each of the steps will be described more specifically.

In the step (a), the liquid (S) containing the metal oxide (A) is prepared. The liquid (S) is a solution or a dispersion. The liquid (S) can be prepared, for example, by a technique employed in commonly-known sol-gel processes. For example, the liquid (S) can be prepared by mixing the above-mentioned compound (L)-based substance, water, and, as necessary, an acid catalyst and/or organic solvent, and by subjecting the compound (L)-based substance to condensation or hydrolytic condensation using a technique employed in commonly-known sol-gel processes. A dispersion of the metal oxide (A) obtained by condensation or hydrolytic condensation of the compound (L)-based substance can as such be used as the liquid (S) containing the metal oxide (A). Where necessary, however, the dispersion may be subjected to a particular process (deflocculation as described above, addition or removal of the solvent for concentration control, or the like).

The step (a) may include a step of subjecting, to condensation (e.g., hydrolytic condensation), at least one selected from the group consisting of the compound (L) and a hydrolysate of the compound (L). Specifically, the step (a) may include a step of subjecting, to condensation or hydrolytic condensation, at least one selected from the group consisting of the compound (L), a partial hydrolysate of the compound (L), a complete hydrolysate of the compound (L), a partial hydrolytic condensate of the compound (L), and a condensate formed by condensation of a part of a complete hydrolysate of the compound (L).

Another example of the method for preparing the liquid (S) is a method including the following steps. First, a metal is gasified in the form of metal atoms by thermal energy, and the metal atoms are brought into contact with a reaction gas (oxygen) to generate molecules and clusters of a metal oxide. Thereafter, the molecules and clusters are cooled instantly to produce small-diameter particles of the metal oxide (A). Next, the particles are dispersed in water or an organic solvent to obtain the liquid (S) (a dispersion containing the metal oxide (A)). In order to enhance the dispersibility in water or an organic solvent, the particles of the metal oxide (A) may be subjected to surface treatment, or a stabilizing agent such as a surfactant may be added. The dispersibility of the metal oxide (A) may be improved by pH control.

Still another example of the method for preparing the liquid (S) is a method in which the metal oxide (A) in the form of a bulk is pulverized using a pulverizer such as a ball mill or a jet mill, and the pulverized metal oxide (A) is dispersed in water or an organic solvent to prepare the liquid (S) (a dispersion containing the metal oxide (A)). However, in the case of this method, control of the shape and size distribution of the particles of the metal oxide (A) may be difficult.

The type of the organic solvent usable in the step (a) is not particularly limited. For example, alcohols such as methanol, ethanol, isopropanol, and normal-propanol, are suitably used.

The content of the metal oxide (A) in the liquid (S) is preferably in the range of 0.1 to 40 mass %, more preferably in the range of 1 to 30 mass %, and even more preferably in the range of 2 to 20 mass %.

In the step (b), the solution (T) containing the phosphorus compound (B) is prepared. The solution (T) can be prepared by dissolving the phosphorus compound (B) in a solvent. In the case where the solubility of the phosphorus compound (B) is low, the dissolution may be promoted by heating treatment or ultrasonic treatment.

The solvent used for the preparation of the solution (T) may be selected as appropriate depending on the type of the phosphorus compound (B), and preferably contains water. As long as the dissolution of the phosphorus compound (B) is not hindered, the solvent may contain: an alcohol such as methanol or ethanol; an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethyl sulfoxide; sulfolane, or the like.

The content of the phosphorus compound (B) in the solution (T) is preferably in the range of 0.1 to 99 mass %, more preferably in the range of 0.1 to 95 mass %, and even more preferably in the range of 0.1 to 90 mass %. The content of the phosphorus compound (B) in the solution (T) may be in the range of 0.1 to 50 mass %, may be in the range of 1 to 40 mass %, or may be in the range of 2 to 30 mass %.

In the step (c), the liquid (S) and the solution (T) are mixed. When mixing the liquid (S) and the solution (T), it is preferable to perform the mixing at a reduced addition rate under vigorous stirring in order to suppress a local reaction. In this case, the solution (T) may be added to the liquid (S) that is being stirred, or the liquid (S) may be added to the solution (T) that is being stirred. When mixed in the step (c), both the liquid (S) and the solution (T) have a temperature of preferably 50° C. or less, more preferably 30° C. or less, even more preferably 20° C. or less. By adjusting their temperatures at the mixing to 50° C. or less, the metal oxide (A) and the phosphorus compound (B) can be homogeneously mixed, and the gas barrier properties of the resulting multilayer structure can be improved. Furthermore, the coating liquid (U) that is excellent in storage stability can be obtained in some cases by continuing the stirring further for about 30 minutes after the completion of the mixing.

The coating liquid (U) may contain the polymer (C). The method for having the polymer (C) contained in the coating liquid (U) is not particularly limited. For example, the polymer (C) in powder or pellet form may be added to and then dissolved in the liquid (S), the solution (T), or a mixture of the liquid (S) and the solution (T). Alternatively, a solution of the polymer (C) may be added to and mixed with the liquid (S), the solution (T), or a mixture of the liquid (S) and the solution (T). Alternatively, the liquid (S), the solution (T), or a mixture of the liquid (S) and the solution (T) may be added to and mixed with a solution of the polymer (C). By having the polymer (C) contained in either the liquid (S) or the solution (T) before the step (c), the rate of reaction between the metal oxide (A) and the phosphorus compound (B) is slowed during the mixing of the liquid (S) and the solution (T) in the step (c), with the result that the coating liquid (U) that is excellent in temporal stability may be obtained.

When the coating liquid (U) contains the polymer (C), a multilayer structure including the layer (YA) containing the polymer (C) can easily be produced.

The coating liquid (U) may contain, as necessary, at least one acid compound (D) selected from acetic acid, hydrochloric acid, nitric acid, trifluoroacetic acid, and trichloroacetic acid. Hereinafter, the at least one acid compound (D) may be simply abbreviated as the "acid compound (D)". The method for having the acid compound (D) contained in the coating liquid (U) is not particularly limited. For example, the acid compound (D) may as such be added to and mixed with the liquid (S), the solution (T), or a mixture of the liquid (S) and the solution (T). Alternatively, a solution of the acid compound (D) may be added to and mixed with the liquid (S), the solution (T), or a mixture of the liquid (S) and the solution (T). Alternatively, the liquid (S), the solution (T), or a mixture of the liquid (S) and the solution (T) may be added to and mixed with a solution of the acid compound (D). When either the liquid (S) or the solution (T) contains the acid compound (D) before the step (c), the rate of reaction between the metal oxide (A) and the phosphorus compound (B) is slowed during the mixing of the liquid (S) and the solution (T) in the step (c), with the result that the coating liquid (U) that is excellent in temporal stability may be obtained.

In the coating liquid (U) containing the acid compound (D), the reaction between the metal oxide (A) and the phosphorus compound (B) is suppressed. Therefore, precipitation or aggregation of the reaction product in the coating liquid (U) can be suppressed. Thus, the use of the coating liquid (U) containing the acid compound (D) may provide an improvement in the appearance of the resulting multilayer structure. In addition, the boiling point of the acid compound (D) is 200° C. or less. Therefore, in the production process of the multilayer structure, the acid compound (D) can easily be removed from the layer (YA), for example, by volatilizing the acid compound (D).

The content of the acid compound (D) in the coating liquid (U) is preferably in the range of 0.1 to 5.0 mass %, and more preferably in the range of 0.5 to 2.0 mass %. When the content is within these ranges, the effect of addition of the acid compound (D) is obtained, and the removal of the acid compound (D) is easy. In the case where an acid substance remains in the liquid (S), the amount of the acid compound (D) to be added may be determined in view of the amount of the residual acid substance.

The liquid obtained by the mixing in the step (c) can as such be used as the coating liquid (U). In this case, the solvent contained in the liquid (S) or the solution (T) generally acts as a solvent of the coating liquid (U). The coating liquid (U) may be prepared by performing a process on the liquid obtained by the mixing in the step (c). For example, a process such as addition of an organic solvent, adjustment of the pH, adjustment of the viscosity, or addition of an additive, may be performed.

An organic solvent may be added to the liquid obtained by the mixing in the step (c), to the extent that the stability of the resulting coating liquid (U) is not impaired. The addition of the organic solvent may make it easy to apply the coating liquid (U) onto the base (X) in the step (II). The organic solvent is preferably one capable of being uniformly mixed in the resulting coating liquid (U). Preferred examples of the organic solvent include: alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile; amides such as dimethylformamide and dimethylacetamide; dimethyl sulfoxide; and sulfolane.

In terms of both the storage stability of the coating liquid (U) and the performance of the coating liquid (U) in its application onto the base, the solid content concentration in the coating liquid (U) is preferably in the range of 1 to 20 mass %, more preferably in the range of 2 to 15 mass %, and even more preferably in the range of 3 to 10 mass %. The solid content concentration in the coating liquid (U) can be calculated, for example, by adding a predetermined amount of the coating liquid (U) onto a petri dish, exposing the coating liquid (U) to a temperature of 100° C. together with the petri dish to remove volatile components such as the solvent, and dividing the mass of the remaining solid contents by the mass of the initially-added coating liquid (U). In that case, it is preferable that the mass of the remaining solid contents be measured each time drying is performed for a given period of time, and the solid content concentration be determined using the last-measured mass of the remaining solid contents when the difference between the values of the mass obtained by the two successive measurements has reduced to a negligible level.

In terms of the storage stability of the coating liquid (U) and the gas barrier properties of the multilayer structure, the pH of the coating liquid (U) is preferably in the range of 0.1 to 6.0, more preferably in the range of 0.2 to 5.0, and even more preferably in the range of 0.5 to 4.0.

The pH of the coating liquid (U) can be adjusted by a commonly-known method, and can be adjusted, for example, by addition of an acidic compound or a basic compound. Examples of the acidic compound include hydrochloric acid, nitric acid, sulfuric acid, acetic acid, butyric acid, and ammonium sulfate. Examples of the basic compound include sodium hydroxide, potassium hydroxide, ammonia, trimethylamine, pyridine, sodium carbonate, and sodium acetate.

The coating liquid (U) changes its state over time, and tends finally to be converted to a gel composition or to undergo precipitation. The time to occurrence of such a state change depends on the composition of the coating liquid (U). In order to stably apply the coating liquid (U) onto the base (X), the viscosity of the coating liquid (U) is preferably stable over a long period of time. When the viscosity at the completion of the step (I) is defined as a reference viscosity, it is preferable to prepare the solution (U) so that the viscosity measured with a Brookfield viscometer (B-type viscometer: 60 rpm) be five times or less the reference viscosity even after the coating liquid (U) is allowed to stand at 25° C. for two days. In many cases where the coating liquid (U) has a viscosity within such a range, the multilayer structure that is excellent in preservation stability and has more excellent gas barrier properties is obtained.

For example, adjustment of the solid content concentration, adjustment of the pH, or addition of a viscosity modifier can be employed as the method for adjusting the viscosity of the coating liquid (U) to the above range. Examples of the viscosity modifier include carboxymethyl cellulose, starch, bentonite, tragacanth gum, stearic acid salts, alginic acid salts, methanol, ethanol, n-propanol, and isopropanol.

The coating liquid (U) may contain another substance other than the above-described substances, as long as the effect of the present invention is obtained. For example, the coating liquid (U) may contain: a metal salt of an inorganic acid such as a metal carbonate, a metal hydrochloride, a metal nitrate, a metal hydrogen carbonate, a metal sulfate, a metal hydrogen sulfate, a metal borate, or a metal aluminate; a metal salt of an organic acid such as a metal oxalate, a metal acetate, a metal tartrate, or a metal stearate; a metal complex such as a metal acetylacetonate complex (aluminum acetylacetonate or the like), a cyclopentadienyl metal complex (titanocene or the like), or a cyano metal complex; a layered clay compound; a crosslinking agent; a polymer compound other than the polymer (C); a plasticizer; an antioxidant; an ultraviolet absorber; or a flame retardant.

[Step (II)]

In the step (II), a precursor layer of the layer (YA) is formed on the base (X) by applying the coating liquid (U) onto the base (X). The coating liquid (U) may be applied directly onto at least one surface of the base (X). Alternatively, before application of the coating liquid (U), the adhesive layer (H) may be formed on the surface of the base (X), for example, by treating the surface of the base (X) with a commonly-known anchor coating agent or by applying a commonly-known adhesive onto the surface of the base (X). Alternatively, the layer (Z) may be formed on the base (X) beforehand in the later-described step (IV), and the precursor layer of the layer (YA) may be formed on the layer (Z) by applying the coating liquid (U) onto the layer (Z).

The coating liquid (U) may be subjected to degassing and/or defoaming as necessary. Examples of the method for degassing and/or defoaming are those using vacuum drawing, heating, centrifugation, ultrasonic waves, etc. A method including vacuum drawing can be preferably used.

A viscosity of the coating liquid (U) to be applied in the step (II), as measured with a Brookfield rotational viscometer (SB-type viscometer: Rotor No. 3, Rotational speed=60 rpm), is preferably 3000 mPa·s or less and more preferably 2000 mPa·s or less at a temperature at which the coating liquid (U) is applied. When the viscosity is 3000 mPa·s or less, the leveling of the coating liquid (U) is improved, and the multilayer structure that is more excellent in appearance can be obtained. The viscosity of the coating liquid (U) to be applied in the step (II) can be adjusted depending on the concentration, the temperature, and the length of time or intensity of stirring performed after the mixing in the step (c). For example, the viscosity can be lowered in some cases by performing stirring for a long period of time after the mixing in the step (c).

The method for applying the coating liquid (U) onto the base (X) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, curtain coating, and bar coating.

In the step (II), generally, the precursor layer of the layer (YA) is formed as a result of removing the solvent in the coating liquid (U). The method for removing the solvent is not particularly limited, and a commonly-known drying method can be used. Specifically, drying methods such as hot-air drying, heat roll contact drying, infrared heating, and microwave heating can be used alone or in combination. The drying temperature is preferably 0 to 15° C. or more lower than the onset temperature of fluidization of the base (X). In the case where the coating liquid (U) contains the polymer (C), the drying temperature is preferably 15 to 20° C. or more lower than the onset temperature of pyrolysis of the polymer (C). The drying temperature is preferably in the range of 70 to 200° C., more preferably in the range of 80 to 180° C., and even more preferably in the range of 90 to 160° C. The removal of the solvent may be carried out under ordinary pressure or reduced pressure. Alternatively, the solvent may be removed by heat treatment in the step (III) described later.

In the case where the layers (YA) are stacked on both surfaces of the base (X) that is in laminar form, a first layer (a precursor layer of a first layer (YA)) may be formed by applying the coating liquid (U) onto one surface of the base (X) and then removing the solvent, after which a second layer (a precursor layer of a second layer (YA)) may be formed by applying the coating liquid (U) onto the other surface of the base (X) and then removing the solvent. The composition of the coating liquid (U) applied may be the same for both of the surfaces or may be different for each surface.

In the case where the layers (YA) are stacked on a plurality of surfaces of the base (X) that has a three-dimensional shape, a layer (a precursor layer of the layer (YA)) may be formed for each of the surfaces by the above method. Alternatively, a plurality of layers (precursor layers of the layers (YA)) may be simultaneously formed by applying the coating liquid (U) simultaneously onto the plurality of surfaces of the base (X) and then performing drying.

[Step (III)]

In the step (III), the layer (YA) is formed by subjecting the precursor layer (the precursor layer of the layer (YA)) formed in the step (II) to heat treatment at a temperature of 110° C. or more.

In the step (III), a reaction proceeds in which the particles of the metal oxide (A) are bonded together via phosphorus atoms (phosphorus atoms derived from the phosphorus compound (B)). From another standpoint, a reaction in which the reaction product (R) is produced proceeds in the step (III). In order for the reaction to proceed sufficiently, the temperature of the heat treatment is 110° C. or more, preferably 120° C. or more, more preferably 140° C. or more, more preferably 170° C. or more, and even more preferably 190° C. or more. A lowered heat treatment temperature increases the time required to achieve sufficiently-progressed reaction, and causes a reduction in productivity. The preferred upper limit of the heat treatment temperature varies depending on the type of the base (X), etc. For example, in the case where a thermoplastic resin film made of polyamide resin is used as the base (X), the heat treatment temperature is preferably 190° C. or less. In the case where a thermoplastic resin film made of polyester resin is used as the base (X), the heat treatment temperature is preferably 220° C. or less. The heat treatment can be carried out in air, a nitrogen atmosphere, an argon atmosphere, or the like.

The length of time of the heat treatment is preferably in the range of 0.1 seconds to 1 hour, more preferably in the range of 1 second to 15 minutes, and even more preferably in the range of 5 to 300 seconds. In an example, the heat treatment is performed at 110 to 220° C. (e.g., at 140° C. to 220° C.) for 0.1 seconds to 1 hour. In another example, the heat treatment is performed at 170 to 200° C. for 5 to 300 seconds (e.g., 10 to 300 seconds).

The method of the present invention for producing the multilayer structure may include a step of irradiating the layer (YA) or the precursor layer of the layer (YA) with an ultraviolet ray. The ultraviolet irradiation may be performed at any time after the step (II) (e.g., after the removal of the solvent of the applied coating liquid (U) is almost completed). The method of the irradiation is not particularly limited, and a commonly-known method can be employed. The wavelength of the ultraviolet ray for irradiation is preferably in the range of 170 to 250 nm, and more preferably in the range of 170 to 190 nm and/or 230 to 250 nm. Alternatively, irradiation with a radioactive ray such as an electron ray or a γ ray may be performed instead of the ultraviolet irradiation. Performing the ultraviolet irradiation may allow the multilayer structure to exhibit a higher level of gas barrier performance.

In the case of treating the surface of the base (X) with a commonly-known anchor coating agent or applying a commonly-known adhesive onto the surface of the base (X) before application of the coating liquid (U) in order to dispose the adhesive layer (H) between the base (X) and the layer (YA), aging treatment is preferably performed. Specifically, the base (X) having the coating liquid (U) applied thereto is preferably left at a relatively low temperature for a long period of time after the application of the coating liquid (U) but before the heat treatment of the step (III). The temperature of the aging treatment is preferably less than 110° C., more preferably 100° C. or less, and even more preferably 90° C. or less. The temperature of the aging treatment is preferably 10° C. or more, more preferably 20° C. or more, and even more preferably 30° C. or more. The length of time of the aging treatment is preferably in the range of 0.5 to 10 days, more preferably in the range of 1 to 7 days, and even more preferably in the range of 1 to 5 days. Performing such aging treatment further enhances the bonding strength between the base (X) and the layer (YA).

[Step (IV)]

In the step (IV), the layer (Z) is formed on the base (X) (or on the layer (Y)) by applying the coating liquid (V) containing the polymer (E) having a plurality of phosphorus atoms. Generally, the coating liquid (V) is a solution of the polymer (E) dissolved in a solvent.

The coating liquid (V) may be prepared by dissolving the polymer (E) in a solvent or a solution obtained at the time of production of the polymer (E) may as such be used. When the solubility of the polymer (E) is low, the dissolution may be promoted by heating treatment or ultrasonic treatment.

The solvent used in the coating liquid (V) may be selected as appropriate depending on the type of the polymer (E), and is preferably water, an alcohol, or a mixed solvent thereof. As long as the dissolution of the polymer (E) is not hindered, the solvent may contain: an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethyl sulfoxide; sulfolane; or the like.

The solid content concentration of the polymer (E) in the coating liquid (V) is preferably in the range of 0.01 to 60 mass %, more preferably in the range of 0.1 to 50 mass %, and even more preferably in the range of 0.2 to 40 mass %, in terms of the storage stability and coating performance of the solution. The solid content concentration can be determined in the same manner as that described for the coating liquid (U).

The pH of the solution of the polymer (E) is preferably in the range of 0.1 to 6.0, more preferably in the range of 0.2 to 5.0, and even more preferably in the range of 0.5 to 4.0, in terms of the storage stability of the coating liquid (V) and the gas barrier properties of the multilayer structure.

The pH of the coating liquid (V) can be adjusted by a commonly-known method, and can be adjusted, for example, by addition of an acidic compound or a basic compound. Examples of the acidic compound include hydrochloric acid, nitric acid, sulfuric acid, acetic acid, butyric acid, and ammonium sulfate. Examples of the basic compound include sodium hydroxide, potassium hydroxide, ammonia, trimethylamine, pyridine, sodium carbonate, and sodium acetate.

When the viscosity of the coating liquid (V) needs to be controlled, a method such as adjustment of the solid content concentration, adjustment of the pH, or addition of a viscosity modifier, can be used. Examples of the viscosity modifier include carboxymethyl cellulose, starch, bentonite, tragacanth gum, stearic acid salts, alginic acid salts, methanol, ethanol, n-propanol, and isopropanol.

The coating liquid (V) may be subjected to degassing and/or defoaming as necessary. Examples of the method for degassing and/or defoaming are those using vacuum drawing, heating, centrifugation, ultrasonic waves, etc. A method including vacuum drawing can be preferably used.

A viscosity of the coating liquid (V) to be applied in the step (IV), as measured with a Brookfield rotational viscometer (SB-type viscometer: Rotor No. 3, Rotational speed=60 rpm), is preferably 1000 mPa·s or less and more preferably 500 mPa·s or less at a temperature at which the coating liquid (V) is applied. When the viscosity is 1000 mPa·s or less, the leveling of the coating liquid (V) is improved, and the multilayer structure that is more excellent in appearance can be obtained. The viscosity of the coating liquid (V) to be applied in the step (IV) can be adjusted depending on the concentration, the temperature, etc.

The method for applying the coating liquid (V) onto the base (X) or the layer (Y) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, curtain coating, and bar coating.

In the step (IV), generally, the layer (Z) is formed as a result of removing the solvent in the coating liquid (V). The method for removing the solvent is not particularly limited, and a commonly-known drying method can be used. Specifically, drying methods such as hot-air drying, heat roll contact drying, infrared heating, and microwave heating can be used alone or in combination. The drying temperature is preferably 0 to 15° C. or more lower than the onset temperature of fluidization of the base (X). The drying temperature is preferably in the range of 70 to 200° C., more preferably in the range of 80 to 180° C., and even more preferably in the range of 90 to 160° C. The removal of the solvent may be carried out under ordinary pressure or reduced pressure. When the step (IV) is carried out following the step (II), the solvent may be removed by the heat treatment in the step (III) previously described.

In the case where the layers (Z) are stacked over both surfaces of the base (X) that is in laminar form with or without the layer (Y) interposed therebetween, a first layer (Z) may be formed by applying the coating liquid (V) over one surface and then removing the solvent, after which a second layer (Z) may be formed by applying the coating liquid (V) over the other surface and then removing the solvent. The composition of the coating liquid (V) applied may be the same for both of the surfaces or may be different for each surface.

In the case where the layers (Z) are stacked over a plurality of surfaces of the base (X) that has a three-dimensional shape with or without the layers (Y) interposed therebetween, the layer (Z) may be formed for each of the surfaces by the above method. Alternatively, a plurality of layers (Z) may be simultaneously formed by applying the coating liquid (V) simultaneously over the plurality of surfaces and then performing drying.

As mentioned above, the steps (I), (II), (III), and (IV) are typically carried out in this order; however, when the layer (Z) is formed between the base (X) and the layer (Y), the step (IV) may be carried out before the step (II). Also, the step (III) can be carried out after the step (IV). In terms of obtaining the multilayer structure that is excellent in appearance, the step (IV) is preferably carried out after the step (III).

The thus obtained multilayer structure can as such be used as the multilayer structure of the present invention. As described above, however, another member (another layer or the like) may further be bonded to or formed on the thus obtained multilayer structure, and the resulting structure may be used as the multilayer structure of the present invention. The bonding of the member can be done by a commonly-known method.

In one aspect, the production method of the present invention includes a step (W) of forming the layer (Y) containing an aluminum atom and the step (IV) of forming the layer (Z) by applying the coating liquid (V) containing the polymer (E) having a plurality of phosphorus atoms. As described above, when the layer (Y) is the layer (YA), the step (W) may include the steps (I), (II), and (III). When the layer (Y) is the layer (YB) or the layer (YC), the step (W) may include a step of forming such a layer by vapor deposition.

EXAMPLES

Hereinafter, the present invention will be described more specifically by using examples. However, the present invention is not limited in any respect by the examples given below. The measurements and evaluations in examples and comparative examples were carried out by the methods described in (1) to (4) below.

(1) Infrared Absorption Spectrum of Layer (Y)

The infrared absorption spectra of the layers (YA) formed in the examples were measured by the following procedures.

First, the layer (YA) stacked on the base (X) was measured for its infrared absorption spectrum using a Fourier transform infrared spectrophotometer ("Spectrum One" manufactured by PerkinElmer Inc.). The infrared absorption spectrum was measured in the range of 700 to 4000 cm$^{-1}$ in ATR (attenuated total reflection) mode. In some cases where the thickness of the layer (YA) is 1 μm or less, an absorption peak attributed to the base (X) is detected in an infrared absorption spectrum obtained by the ATR method, and the absorption intensity attributed solely to the layer (YA) cannot be determined accurately. In such a case, the infrared absorption spectrum of the base (X) alone was measured separately, and was subtracted to extract only the peak attributed to the layer (X). Also when the layer (YA) is stacked on the layer (Z), the same method can be employed. In the case where the layer (YA) is formed as an inner layer of the multilayer structure (e.g., in the case of the stacking order of base (X)/layer (YA)/layer (Z)), the infrared absorption spectrum of the layer (YA) can be obtained by performing the measurement before formation of the layer (Z) or by, after formation of the layer (Z), delaminating the layer (Z) at the interface with the layer (YA) and then measuring the infrared absorption spectrum of the exposed layer (YA).

Based on the thus obtained infrared absorption spectrum of the layer (YA), a maximum absorption wavenumber ($n^1$) in the range of 800 to 1400 cm$^{-1}$ and an absorbance ($\alpha^1$) at the maximum absorption wavenumber ($n^1$) were determined. Also determined were a maximum absorption wavenumber ($n^2$) at which the absorption due to stretching vibration of a hydroxyl group in the range of 2500 to 4000 cm$^{-1}$ reaches a maximum, and an absorbance ($\alpha^2$) at the maximum absorption wavenumber ($n^2$). In addition, a half width of the absorption peak at the maximum absorption wavenumber ($n^1$) was obtained by determining two wavenumbers at which the absorbance is a half of the absorbance ($\alpha^1$) (absorbance ($\alpha^1$)/2) in the absorption peak and calculating the difference between the two wavenumbers. In the case where the absorption peak at the maximum absorption wavenumber ($n^1$) overlapped an absorption peak attributed to another component, the absorption peaks attributed to the different components were separated by least-squares method using a Gaussian function, and then the half width of the absorption peak at the maximum absorption wavenumber ($n^1$) was obtained in the same manner as described above.

(2) Appearance of Multilayer Structure

The appearances of the multilayer structures obtained were evaluated by visual inspection according to the following ratings.

A: Very good appearance that was colorless, transparent, and uniform.

B: Good appearance, albeit slightly opaque or uneven.

(3) Oxygen Transmission Rate (Os) at 20° C. and 85% RH

The oxygen transmission rate was measured using an oxygen transmission testing system ("MOCON OX-TRAN 2/20" manufactured by ModernControls, Inc.). Specifically, the multilayer structure was set in such a manner that the layer (YZ) (or layer (YZ)) faced the oxygen feed-side and the base (X) faced the carrier gas-side, and the oxygen transmission rate (in units of ml/(m$^2$·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(4) Oxygen Transmission Rate (Of) at 20° C. and 85% RH as Measured After Keeping 5% Stretched State at 23° C. and 50% RH for 5 Minutes A multilayer structure having a size of 21 cm×30 cm was fabricated. Then, the multilayer structure was left at 23° C. and 50% RH for over 24 hours, after which the multilayer structure was longitudinally stretched by 5% and allowed to keep the stretched state for 5 minutes. Thus, a multilayer structure subjected to stretching was obtained. The oxygen transmission rate was measured using an oxygen transmission testing system ("MOCON OX-TRAN 2/20" manufactured by ModernControls, Inc.). Specifically, the multilayer structure was set in such a manner that the layer (YZ) faced the oxygen feed-side and the base (X) faced the carrier gas-side, and the oxygen transmission rate (in units of ml/(m$^2$·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

[Production Examples of Coating Liquid (U)]

Production examples of the coating liquid (U) used for producing the layer (YA) will be described.

Distilled water in an amount of 230 parts by mass was heated to 70° C. under stirring. Aluminum isopropoxide in an amount of 88 parts by mass was added dropwise to the distilled water over 1 hour, the liquid temperature was gradually increased to 95° C., and isopropanol generated was distilled off. In this manner, hydrolytic condensation was performed. To the obtained liquid was added 4.0 parts by mass of a 60 mass % aqueous solution of nitric acid, followed by stirring at 95° C. for 3 hours to deflocculate the agglomerates of the particles of the hydrolytic condensate. Thereafter, the resulting liquid was concentrated so that the solid content concentration was 10 mass % in terms of alumina content. To 18.66 parts by mass of the thus obtained dispersion were added 58.19 parts by mass of distilled water, 19.00 parts by mass of methanol, and 0.50 parts by mass of a 5 mass % aqueous solution of polyvinyl alcohol, followed by stirring to make the mixture homogeneous. Thus, a dispersion (S1) was obtained. Additionally, 3.66 parts by mass of a 85 mass % aqueous solution of phosphoric acid was used as a solution (T1). Subsequently, the temperatures of both the dispersion (S1) and the solution (T1) were adjusted to 15° C. Next, with the liquid temperatures maintained at 15° C., the solution (T1) was added dropwise to the dispersion (S1) that was being stirred. Thus, a coating liquid (U1) was obtained. With the temperature of the obtained coating liquid (U1) held at 15° C., the coating liquid (U1) was continuously stirred until its viscosity reached 1500 mPa·s. In the coating liquid (U1), the ratio of the number of moles ($N_M$) of metal atoms constituting the metal oxide (A) (alumina) to the number of moles ($N_P$) of phosphorus atoms constituting the phosphorus compound (B) (phosphoric acid) (the number of moles ($N_M$)/the number of moles ($N_P$)) was 1.15.

A coating liquid (U2), a coating liquid (U3), and a coating liquid (U4) were obtained in the same manner as above, except that the ratio $N_M/N_P$ was changed to 4.48, 1.92, and 0.82.

[Production Examples of Coating Liquid (V)]

A round-bottom flask (with an inner volume of 50 ml) fitted with a stirrer and a thermometer was subjected to nitrogen replacement. Into the flask was introduced 2.5 g of water as a solvent, and then a mixed solution of 10 g of vinylphosphonic acid (which may be abbreviated as "VPA" hereinafter), 2.5 g of water, and 25 mg of 2,2'-azobis(2-amidinopropane)dihydrochloride (which may be abbreviated as "ALBA" hereinafter) was added dropwise into the round-bottom flask under stirring. From this point through the entire processes for polymerization, a slight amount of nitrogen gas was continuously fed. The round-bottom flask was immersed in an oil bath, and the reaction was allowed to proceed at 80° C. for 3 hours, after which the reaction mixture was diluted with 15 g of water, and filtered through a cellulose membrane ("Spectra/Por" (trade name) manufactured by Spectrum Laboratories, Inc). Next, the solvent in the filtrate was distilled off with an evaporator, followed by vacuum drying at 50° C. for 24 hours to yield a white polymer. The molecular weight of this polymer was measured by a gel permeation chromatograph using a 1.2 wt % aqueous NaCl solution as a solvent with the polymer concentration set at 0.1 wt %. The number average molecular weight was about 10,000 as determined in terms of polyethylene glycol molecular weight.

The polymer purified was dissolved in a mixed solvent of water and methanol at a concentration of 10 wt %, so that a coating liquid (V1) was obtained.

A coating liquid (V2) including a homopolymer of 4-vinylbenzyl phosphonic acid (which may be abbreviated as "VBPA" hereinafter) was obtained in the same manner as for the preparation of the coating liquid (V1). Similarly, a coating liquid (V3) including a copolymer of VPA and methacrylic acid (which may be abbreviated as "MA" hereinafter) copolymerized at a molar ratio of 2/1 and a coating liquid (V4) including a copolymer of VPA and methacrylic acid copolymerized at a molar ratio of 1/1 were further obtained.

Example 1

An oriented polyethylene terephthalate film ("Lumirror P60" (trade name) manufactured by TORAY INDUSTRIES, INC. and having a thickness of 12 μm; this film may be abbreviated as "PET" hereinafter) was prepared as a base. The coating liquid (U1) was applied onto the base (PET) with a bar coater in such a manner that the dry thickness was 0.5 μm. Drying was performed at 110° C. for 5 minutes. Subsequently, heat treatment was performed at 180° C. for 1 minute, and thus a structure (A1) having a configuration of layer (Y1) (0.5 μm)/PET (12 μm) was obtained. Next, the coating liquid (V1) was applied onto the layer (Y1) of the structure (A1) in such a manner that the dry thickness was 0.3 μm. Drying was performed at 110° C. for 5 minutes, so that a multilayer structure (B1) of the present invention having a configuration of layer (Z1) (0.3 µm)/layer (Y1) (0.5 µm)/PET (12 µm) was obtained.

The moisture permeability (water vapor transmission rate: WVTR) of the obtained multilayer structure (B1) was measured using a water vapor transmission testing system ("MOCON PERMATRAN 3/33" manufactured by Modern-Controls, Inc.). Specifically, the multilayer structure was set in such a manner that the layer (Z1) faced the water vapor feed-side and the layer of PET faced the carrier gas-side, and the moisture permeability (in units of $g/(m^2 \cdot day)$) was measured under conditions where the temperature was 40° C., the humidity on the water vapor feed-side was 90% RH, and the humidity on the carrier gas-side was 0% RH. The moisture permeability of the multilayer structure (B1) was 0.2 $g/(m^2 \cdot day)$.

Examples 2 and 3

Multilayer structures were obtained in the same manner as in Example 1, except that the thickness of the layer (Z) was changed according to Table 1.

Examples 4 to 6

Multilayer structures were obtained in the same manner as in Example 1, except that the coating liquid (V) used was changed according to Table 1.

Examples 7 to 9

Multilayer structures were obtained in the same manner as in Example 1, except that the conditions of the heat treatment were changed according to Table 1.

Examples 10 to 12

Multilayer structures were obtained in the same manner as in Example 1, except that the coating liquid (U) used was changed according to Table 1.

Example 13

A multilayer structure was obtained in the same manner as in Example 1, except that the heat treatment step was carried out after formation of the layer (Z).

Example 14

A multilayer structure was obtained in the same manner as in Example 1, except that the layer (Y) and the layer (Z) were stacked on both surfaces of the base. The moisture permeability of the obtained multilayer structure, as measured in the same manner as in Example 1, was not more than 0.1 $g/(m^2 \cdot day)$.

Example 15

A multilayer structure was obtained in the same manner as in Example 1, except that the base was an oriented nylon film ("EMBLEM ONBC" (trade name) manufactured by UNITIKA LTD. and having a thickness of 15 µm; this film may be abbreviated as "ONY").

Example 16

A multilayer structure was obtained in the same manner as in Example 1, except that the layer (Y) was formed after formation of the layer (Z).

Example 17

A multilayer structure was obtained in the same manner as in Example 1, except that the layer (Y) was a deposited layer of aluminum having a thickness of 0.03 µm. The aluminum layer was formed by vacuum deposition.

Example 18

A multilayer structure was obtained in the same manner as in Example 1, except that the layer (Y) was a deposited layer of aluminum oxide having a thickness of 0.03 µm. The aluminum oxide layer was formed by vacuum deposition.

Comparative Examples 1 to 18

Multilayer structures prepared according to Examples 1 to 18 but without formation of the layer (Z) were used as the multilayer structures of Comparative Examples 1 to 18.

Comparative Example 19

A multilayer structure was obtained in the same manner as in Example 1, except that the layer (Y) was a layer (Y)' which was a deposited layer of silicon oxide having a thickness of 0.03 µm. The silicon oxide layer was formed by vacuum deposition.

Comparative Example 20

A multilayer structure was obtained in the same manner as in Example 1, except that the layer (Y) was not formed.

Comparative Example 21

A multilayer structure was obtained in the same manner as in Example 1, except that the layer (Z) was formed on the PET layer. That is, in Comparative Example 20, a multilayer structure having a configuration of layer (Y1) (0.5 µm)/PET (12 µm)/layer (Z1) (0.3 µm) was fabricated.

Comparative Example 22

A multilayer structure prepared according to Comparative Example 19 but without formation of the layer (Z) was used as the multilayer structure of Comparative Example 22.

Comparative Example 23

A material prepared according to Comparative Example 20 but without formation of the layer (Z), that is, the base (PET) alone, was used as Comparative Example 23.

The production conditions and evaluation results for Examples and Comparative Examples are shown in Tables 1 to 3 below. In the tables, "-" means "not used", "not calculable", "not carried out", "not measurable", or the like.

TABLE 1

| Examples·Comp. Examples (with layer (Z)) | Base (X) | Layer (Y) Type | Thickness (μm) | Coating liquid | $N_M/N_P$ | Heat treatment step Temperature (° C.) | Time (min) | Layer (Z) Thickness (μm) | Coating liquid | Polymer (E) |
|---|---|---|---|---|---|---|---|---|---|---|
| Example 1 | PET | YA | 0.5 | U1 | 1.15 | 180 | 1 | 0.3 | V1 | VPA homopolymer |
| Example 2 | PET | YA | 0.5 | U1 | 1.15 | 180 | 1 | 0.1 | V1 | VPA homopolymer |
| Example 3 | PET | YA | 0.5 | U1 | 1.15 | 180 | 1 | 0.5 | V1 | VPA homopolymer |
| Example 4 | PET | YA | 0.5 | U1 | 1.15 | 180 | 1 | 0.3 | V2 | VBPA homopolymer |
| Example 5 | PET | YA | 0.5 | U1 | 1.15 | 180 | 1 | 0.3 | V3 | VPA/MA copolymer (2/1) |
| Example 6 | PET | YA | 0.5 | U1 | 1.15 | 180 | 1 | 0.3 | V4 | VPA/MA copolymer (1/1) |
| Example 7 | PET | YA | 0.5 | U1 | 1.15 | 120 | 5 | 0.3 | V1 | VPA homopolymer |
| Example 8 | PET | YA | 0.5 | U1 | 1.15 | 150 | 3 | 0.3 | V1 | VPA homopolymer |
| Example 9 | PET | YA | 0.5 | U1 | 1.15 | 200 | 1 | 0.3 | V1 | VPA homopolymer |
| Example 10 | PET | YA | 0.5 | U2 | 4.48 | 180 | 1 | 0.3 | V1 | VPA homopolymer |
| Example 11 | PET | YA | 0.5 | U3 | 1.92 | 180 | 1 | 0.3 | V1 | VPA homopolymer |
| Example 12 | PET | YA | 0.5 | U4 | 0.82 | 180 | 1 | 0.3 | V1 | VPA homopolymer |
| Example 13 | PET | YA | 0.5 | U1 | 1.15 | 180 | 1 (*1) | 0.3 | V1 | VPA homopolymer |
| Example 14 | PET | YA | 0.5 | U1 | 1.15 | 180 | 1 | 0.3 | V1 | VPA homopolymer |
| Example 15 | ONY | YA | 0.5 | U1 | 1.15 | 180 | 1 | 0.3 | V1 | VPA homopolymer |
| Example 16 | PET | YA | 0.5 | U1 | 1.15 | 180 | 1 | 0.3 | V1 | VPA homopolymer |
| Example 17 | PET | YB | 0.03 | Deposited aluminum metal | | | | 0.3 | V1 | VPA homopolymer |
| Example 18 | PET | YC | 0.03 | Deposited aluminum oxide | | | | 0.3 | V1 | VPA homopolymer |
| Comp. Example 19 | PET | | 0.03 | Deposited silicon oxide | | | | 0.3 | V1 | VPA homopolymer |
| Comp. Example 20 | PET | | | — | | | | 0.3 | V1 | VPA homopolymer |
| Comp. Example 21 | PET | YA | 0.5 | U1 | 1.15 | 180 | 1 | 0.3 | V1 | VPA homopolymer |

[Abbreviations in table]
$N_M/N_P$: The ratio of the number of moles ($N_M$) of metal atoms in the metal oxide (A) to the number of moles ($N_P$) of phosphorus atoms derived from the phosphorus compound (B)
VPA: Vinylphosphonic acid
VBPA: 4-vinylbenzyl phosphonic acid
MA: Methacrylic acid
(*1) The heat treatment was carried out after formation of the layer (Z).

TABLE 2

| Examples·Comp. Examples (with layer (Z)) | Layer configuration of multilayer structure | Appearance | Infrared absorption spectrum of layer (Y) $n^1$ (cm$^{-1}$) | Half width (cm$^{-1}$) | $\alpha^2/\alpha^1$ | Oxygen transmission rate Before stretching ml/(m$^2$ · day · atm) | After stretching |
|---|---|---|---|---|---|---|---|
| Example 1 | Layer (Z)/layer (Y)/PET | A | 1108 | 37 | <0.1 | 0.20 | 0.24 |
| Example 2 | Layer (Z)/layer (Y)/PET | A | 1108 | 37 | <0.1 | 0.20 | 0.45 |
| Example 3 | Layer (Z)/layer (Y)/PET | A | 1108 | 37 | <0.1 | 0.21 | 0.27 |
| Example 4 | Layer (Z)/layer (Y)/PET | A | 1108 | 37 | <0.1 | 0.20 | 1.2 |
| Example 5 | Layer (Z)/layer (Y)/PET | A | 1108 | 37 | <0.1 | 0.20 | 1.9 |
| Example 6 | Layer (Z)/layer (Y)/PET | A | 1108 | 37 | <0.1 | 0.20 | 2.4 |
| Example 7 | Layer (Z)/layer (Y)/PET | A | 1111 | 61 | <0.1 | 0.58 | 0.82 |
| Example 8 | Layer (Z)/layer (Y)/PET | A | 1108 | 46 | <0.1 | 0.28 | 0.57 |
| Example 9 | Layer (Z)/layer (Y)/PET | A | 1107 | 35 | <0.1 | 0.19 | 0.23 |
| Example 10 | Layer (Z)/layer (Y)/PET | A | 1122 | 140 | 0.29 | 0.96 | 1.5 |
| Example 11 | Layer (Z)/layer (Y)/PET | A | 1102 | 43 | <0.1 | 0.22 | 0.34 |
| Example 12 | Layer (Z)/layer (Y)/PET | A | 1113 | 31 | <0.1 | 0.77 | 1.4 |
| Example 13 | Layer (Z)/layer (Y)/PET | B | 1113 | 43 | <0.1 | 0.25 | 0.30 |
| Example 14 | Layer (Z)/layer (Y)/PET/layer (Y)/layer (Z) | A | 1108 | 37 | <0.1 | 0.06 | 0.11 |
| Example 15 | Layer (Z)/layer (Y)/ONY | A | 1109 | 40 | <0.1 | 0.24 | 0.53 |
| Example 16 | Layer (Y)/layer (Z)/PET | A | 1114 | 48 | <0.1 | 0.31 | 0.98 |
| Example 17 | Layer (Z)/layer (Y)/PET | A | — | — | — | 1.8 | 3.6 |
| Example 18 | Layer (Z)/layer (Y)/PET | A | — | — | — | 0.81 | 2.4 |
| Comp. Example 19 | Layer (Z)/layer (Y)/PET | A | — | — | — | 0.74 | 6.6 |
| Comp. Example 20 | Layer (Z)/PET | A | — | — | — | >50 | >50 |
| Comp. Example 21 | Layer (Y)/PET/layer (Z) | A | 1108 | 37 | <0.1 | 0.20 | 6.1 |

[Abbreviations in table]
$n^1$: Maximum absorption wavenumber ($n^1$),
$\alpha^2/\alpha^1$: Absorbance ($\alpha^2$)/Absorbance ($\alpha^1$)

TABLE 3

| Comp. Examples (without layer (Z)) | Layer configuration of multilayer structure | Oxygen transmission rate After stretching ml/(m² · day · atm) |
|---|---|---|
| Comp. Example 1 | Layer (Y)/PET | 6.1 |
| Comp. Example 2 | Layer (Y)/PET | 5.9 |
| Comp. Example 3 | Layer (Y)/PET | 6.2 |
| Comp. Example 4 | Layer (Y)/PET | 6.0 |
| Comp. Example 5 | Layer (Y)/PET | 5.9 |
| Comp. Example 6 | Layer (Y)/PET | 5.8 |
| Comp. Example 7 | Layer (Y)/PET | 7.3 |
| Comp. Example 8 | Layer (Y)/PET | 6.8 |
| Comp. Example 9 | Layer (Y)/PET | 5.5 |
| Comp. Example 10 | Layer (Y)/PET | 8.9 |
| Comp. Example 11 | Layer (Y)/PET | 6.3 |
| Comp. Example 12 | Layer (Y)/PET | 8.0 |
| Comp. Example 13 | Layer (Y)/PET | 6.1 |
| Comp. Example 14 | Layer (Y)/PET/layer (Y) | 4.4 |
| Comp. Example 15 | Layer (Y)/ONY | 7.8 |
| Comp. Example 16 | Layer (Y)/PET | 6.0 |
| Comp. Example 17 | Layer (Y)/PET | 13.8 |
| Comp. Example 18 | Layer (Y)/PET | 9.7 |
| Comp. Example 22 | Layer (Y)/PET | 6.9 |
| Comp. Example 23 | PET | >50 |

As is apparent from the tables, the multilayer structures of Examples were able to maintain their gas barrier properties at a high level even when subjected to a high stretching stress. In addition, the multilayer structures of Examples showed good appearance.

Example 19

In Example 19, a vertical form fill seal bag was fabricated using a multilayer structure of the present invention. First, the multilayer structure (B1) was fabricated in the same manner as in Example 1. Next, the multilayer structure (B1) was coated with a two-component adhesive (including A-520 (trade name) and A-50 (trade name) manufactured by Mitsui Takeda Chemicals, Inc.) and then dried. The thus prepared product and an oriented nylon film (ONY described above) were laminated together to obtain a laminate. Subsequently, the oriented nylon film of the laminate was coated with a two-component adhesive (including A-520 (trade name) and A-50 (trade name) manufactured by Mitsui Takeda Chemicals, Inc.) and then dried. The thus prepared product and a non-oriented polypropylene film (RXC-21 (trade name) manufactured by Tohcello Co., Ltd. and having a thickness of 70 μm; this film may be abbreviated as "CPP 70" hereinafter) were laminated together. Thus, a multilayer structure (C19) having a configuration of PET/layer (Y1)/layer (Z1)/adhesive/ONY/adhesive/CPP 70 was obtained.

Next, the multilayer structure (C19) was cut into a 400-nm-wide piece, which was fed to a vertical form fill seal packaging machine (manufactured by ORIHIRO Co., Ltd.) so that a vertical form fill seal bag of the fin seal type (having a width of 160 mm and a length of 470 mm) was fabricated. Next, the vertical form fill seal bag consisting of the multilayer structure (C19) was filled with 2 kg of water using the form fill seal packaging machine. The processability of the multilayer structure (C19) in the form fill seal packaging machine was good, and no defects such as wrinkles and streaks were observed in the appearance of the obtained vertical form fill seal bag.

Example 20

In Example 20, a vacuum packaging bag was fabricated using a multilayer structure of the present invention. First, the multilayer structure (B1) was fabricated in the same manner as in Example 1. Next, an oriented nylon film (ONY described above) was coated with a two-component adhesive (including A-520 (trade name) and A-50 (trade name) manufactured by Mitsui Takeda Chemicals, Inc.) and then dried. The thus prepared product and the multilayer structure (B1) were laminated together. Next, the laminated multilayer structure (B1) was coated with a two-component adhesive (including A-520 (trade name) and A-50 (trade name) manufactured by Mitsui Takeda Chemicals, Inc.) and then dried. The thus prepared product and a non-oriented polypropylene film (CPP 70 described above) were laminated together. In this manner, a multilayer structure (C20) having a configuration of ONY/adhesive/layer (Z1)/layer (Y1)/PET/adhesive//CPP 70 was obtained.

Next, two pieces of laminates having the shape of a 22 cm×30 cm rectangle were cut from the multilayer structure (C20). The two pieces of the multilayer structure (C20) were stacked together in such a manner that the CPP 70 were located interiorly. Then, the three sides of the rectangular stack were heat-sealed to form a bag. Wood spheres (having a diameter of 30 mm) were used as a model of a solid food, and the bag was filled with the spheres closely arranged in a single layer so that the spheres were in contact with each other. Thereafter, the air inside the bag was removed by degassing, the remaining one side was heat-sealed, and thus a vacuum packaging bag was fabricated. In the obtained vacuum packaging bag, the multilayer structure (C20) closely adhered to the spheres along the irregularities of the surfaces of the spheres.

Example 21

In Example 21, a spouted pouch was fabricated using a multilayer structure of the present invention. First, a multilayer structure (C21) having a configuration of PET/layer (Y1)/layer (Z1)/adhesive/ONY/adhesive/CPP 70 was obtained in the same manner as in Example 19. Next, the multilayer structure (C21) was cut into two pieces having a predetermined shape, and then the two pieces of the multilayer structure (C21) were stacked together in such a manner that the CPP 70 were located interiorly. The edges of the stack were heat-sealed, and a spout made of polypropylene was attached by heat sealing. In this manner, a spouted pouch of the flat type was able to be fabricated without any problem.

Example 22

In Example 22, a laminated tube container was fabricated using a multilayer structure of the present invention. First, the multilayer structure (B1) was fabricated in the same manner as in Example 1. Next, two non-oriented polypropylene films (RXC-21 (trade name) manufactured by Tohcello Co., Ltd. and having a thickness of 100 μm; these films may be abbreviated as "CPP 100" hereinafter) were each coated with a two-component adhesive (including A-520 (trade name) and A-50 (trade name) manufactured by Mitsui Takeda Chemicals, Inc.) and then dried. The thus prepared products were laminated to the multilayer structure (B1). In this manner, a multilayer structure (C22) having a configuration of CPP 100/adhesive/layer (Z1)/layer (Y1)/PET/adhesive/CPP 100 was obtained.

Next, the multilayer structure (C22) was cut into a predetermined shape, and formed into a tubular roll having an overlapping portion, which was heat-sealed to fabricate a tubular body. Next, the tubular body was mounted to a mandrel for tube container formation, and a shoulder portion in the shape of a circular truncated cone and a head portion continuous with the shoulder portion were formed at one end of the tubular body. The shoulder portion and the head portion were formed by compression molding of a polypropylene resin. Next, a cap made of polypropylene resin was attached to the head portion. Next, the other open end of the tubular body was heat-sealed. In this manner, a laminated tube container was able to be fabricated without any problem.

Example 23

In Example 23, an infusion bag was fabricated using a multilayer structure of the present invention. First, a multilayer structure (C23) having a configuration of PET/layer (Y1)/layer (Z1)/adhesive/ONY/adhesive/CPP 70 was obtained in the same manner as in Example 19. Next, the multilayer structure (C23) was cut into two pieces having a predetermined shape, and then the two pieces of the multilayer structure (C23) were stacked together in such a manner that the CPP 70 were located interiorly. The edges of the stack were heat-sealed, and a spout made of polypropylene was attached by heat sealing. In this manner, an infusion bag was able to be fabricated without any problem.

Example 24

In Example 24, a container lid was fabricated using a multilayer structure of the present invention. First, a multilayer structure (C24) having a configuration of PET/layer (Y1)/layer (Z1)/adhesive/ONY/adhesive/CPP 70 was obtained in the same manner as in Example 19. Next, the multilayer structure (C24) was cut into the form of a circular container lid having a diameter of 88 mm. Also prepared was a cylindrical container (Hi-Retoflex HR78-84 manufactured by Toyo Seikan Co., Ltd.) having a three-layer configuration of polyolefin layer/steel layer/polyolefin layer and having a diameter of 78 mm, a flange width of 6.5 mm, and a height of 30 mm. This container was almost fully filled with water, and the container lid consisting of the multilayer structure (C24) was heat-sealed to the flange portion. In this manner, a lidded container using the container lid was able to be fabricated without any problem.

Example 25

In Example 25, a paper container was fabricated using a multilayer structure of the present invention. First, the multilayer structure (B1) was fabricated in the same manner as in Example 1. Next, an adhesive was applied onto both surfaces of a 400 g/m² paper board, and then a polypropylene resin (which may be abbreviated as "PP" hereinafter) was extrusion-laminated to the two surfaces to form PP layers (each having a thickness of 20 μm) on the two surfaces of the paper board. Thereafter, an adhesive was applied to the surface of one of the PP layers, onto which the multilayer structure (B1) was laminated. Furthermore, an adhesive was applied to the surface of the multilayer structure (B1), which was then attached to a non-oriented polypropylene film (CPP 70 described above). In this manner, a multilayer structure (C25) having a configuration of PP/paper board/PP/adhesive/layer (Z1)/layer (Y1)/PET/adhesive/CPP 70 was fabricated. In the fabrication of the multilayer structure (C25), an anchor coat agent was used as necessary.

Using the thus obtained multilayer structure (C25), a brick-type paper container was able to be fabricated without any problem.

Example 26

In Example 26, a vacuum insulator was fabricated using a multilayer structure of the present invention. First, a multilayer structure (C26) having a configuration of ONY/adhesive/layer (Z1)/layer (Y1)/PET/adhesive/CPP 70 was obtained in the same manner as in Example 20. Next, the multilayer structure (C26) was cut into two pieces having a predetermined shape, and then the two pieces of the multilayer structure (C26) were stacked together in such a manner that the CPP 70 were located interiorly. The three sides of the rectangular stack were heat-sealed to form a bag. Next, a heat-insulating core material was put into the bag through the opening of the bag, and the bag was hermetically sealed using a vacuum packaging machine (VAC-STAR 2500 manufactured by Frimark GmbH) so that the internal pressure was 10 Pa at a temperature of 20° C. In this manner, a vacuum insulator was able to be fabricated without any problem. As the heat-insulating core material, a fine silica powder dried in a 120° C. atmosphere for 4 hours was used.

Example 27

In Example 27, a solar cell module was fabricated using a multilayer structure of the present invention. First, the multilayer structure (B1) was fabricated in the same manner as in Example 1. Next, an amorphous silicon solar cell placed on a 10-cm-square reinforced glass sheet was enclosed by a 450-μm-thick ethylene-vinyl acetate copolymer film, onto which the multilayer structure (B1) was attached in such a manner that the layer (Z1) faced the film. Thus, a solar cell module was fabricated. The attachment was carried out by vacuum drawing at 150° C. for 3 minutes, followed by pressure bonding for 9 minutes. The thus fabricated solar cell module operated well, and continued to exhibit good electrical output characteristics over a long period of time.

INDUSTRIAL APPLICABILITY

The multilayer structure of the present invention is excellent in gas barrier properties and has good appearance. In addition, the multilayer structure can maintain the gas barrier properties at a high level even when subjected to physical stresses such as deformation and impact. Therefore, the multilayer structure of the present invention can be preferably used as a packaging material for foods, chemicals, medical devices, industrial materials, and garments.

Examples of applications other than the use as a packaging material include uses as or in an electronic device-related member, a member for optical communication, a flexible film for electronic equipment, a barrier membrane for fuel cells, a sealing film for fuel cells, and a substrate film for various functional films, and examples of the electronic device-related member include: display members such as a substrate film for LCDs, a substrate film for organic EL devices, a substrate film for electronic paper, a sealing film for electronic devices, and a film for PDPs; a film for LEDs; a film for IC tags; a solar cell module; and solar cell members such as a back sheet for solar cells, and a protective film for solar cells.

The invention claimed is:

1. A multilayer structure, comprising at least one base (X), at least one layer (Y), and at least one layer (Z), wherein:
the base (X) comprises a thermoplastic resin film layer;
the layer (Y) comprises an aluminum atom;
the layer (Z) comprises a polymer (E) having a plurality of phosphorus atoms;
the polymer (E) is a polymer of at least one monomer comprising a vinylphosphonic acid compound;
the multilayer structure comprises at least one pair of the layer (Y) and the layer (Z) that are contiguously stacked.

2. The multilayer structure according to claim 1, having a configuration comprising at least one set of the base (X), the layer (Y), and the layer (Z) that are stacked in order of the base (X)/the layer (Y)/the layer (Z).

3. The multilayer structure according to claim 2, wherein the polymer (E) is poly(vinylphosphonic acid) represented by the following general formula (I):

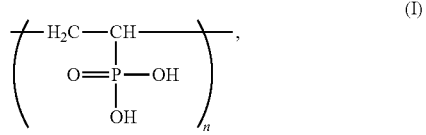

where n is a natural number.

4. The multilayer structure according to claim 1, wherein:
the layer (Y) is a layer (YA) comprising a reaction product (R);
the reaction product (R) is a reaction product formed by reaction between a metal oxide (A) comprising aluminum and a phosphorus compound (B); and
in an infrared absorption spectrum of the layer (YA), a wavenumber ($n^1$) at which infrared absorption in the range of 800 to 1400 $cm^{-1}$ reaches a maximum is 1080 to 1130 $cm^{-1}$.

5. The multilayer structure according to claim 4, wherein:
in the infrared absorption spectrum of the layer (YA), an absorbance ($\alpha^1$) at the wavenumber ($n^1$) and an absorbance ($\alpha^2$) at a wavenumber ($n^2$) satisfy a relationship of absorbance ($\alpha^2$)/absorbance ($\alpha^1$)≤0.2; and
the wavenumber ($n^2$) is a wavenumber at which, in the infrared absorption spectrum of the layer (YA), infrared absorption due to stretching vibration of a hydroxyl group in the range of 2500 to 4000 $cm^{-1}$ reaches a maximum.

6. The multilayer structure according to claim 4, wherein an absorption peak at the wavenumber ($n^1$) has a half width of 200 $cm^{-1}$ or less.

7. The multilayer structure according to claim 4, wherein:
the metal oxide (A) is a hydrolytic condensate of a compound (L) comprising a metal atom (M) to which a hydrolyzable characteristic group is bonded;
the compound (L) comprises at least one compound ($L^1$) represented by the following formula (II):

$X^1$ is selected from the group consisting of F, Cl, Br, I, $R^2O-$, $R^3C(=O)O-$, $(R^4C(=O))_2CH-$, and $NO_3$;
$R^1$, $R^2$, $R^3$, and $R^4$ are each selected from the group consisting of an alkyl group, an aralkyl group, an aryl group, and an alkenyl group; and m represents an integer of 1 to 3; and
when a plurality of $X^1$ are present in the formula (II), the plurality of $X^1$ may be the same as or different from each other,
when a plurality of $R^1$ are present in the formula (II), the plurality of $R^1$ may be the same as or different from each other,
when a plurality of $R^2$ are present in the formula (II), the plurality of $R^2$ may be the same as or different from each other,
when a plurality of $R^3$ are present in the formula (II), the plurality of $R^3$ may be the same as or different from each other, and
when a plurality of $R^4$ are present in the formula (II), the plurality of $R^4$ may be the same as or different from each other.

8. The multilayer structure according to claim 7, wherein the compound ($L^1$) is at least one compound selected from aluminum triisopropoxide and aluminum tri-s-butoxide.

9. The multilayer structure according to claim 4, wherein the phosphorus compound (B) is at least one compound selected from the group consisting of phosphoric acid, polyphosphoric acid, phosphorous acid, phosphonic acid, and derivatives thereof.

10. The multilayer structure according to claim 4, wherein, in the layer (YA), the number of moles $N_M$ of metal atoms (M) constituting the metal oxide (A) and the number of moles $N_P$ of phosphorus atoms derived from the phosphorus compound (B) satisfy a relationship of 1.0≤(the number of moles $N_M$)/(the number of moles $N_P$)≤3.6.

11. The multilayer structure according to claim 1, wherein the layer (Y) is a deposited layer of aluminum or a deposited layer of aluminum oxide.

12. The multilayer structure according to claim 1, having an oxygen transmission rate of 4 ml/($m^2$·day·atm) or less at 20° C. and 85% RH as measured after the multilayer structure is kept stretched by 5% at 23° C. and 50% RH for 5 minutes.

13. The multilayer structure according to claim 1, having an oxygen transmission rate or 4 ml ($m^2$·day ·atm) or less at 20° C. and 85% RH as measured after the multilayer structure is kept stretched by 5% at 23° C. and 50% RH for 5 minutes.

14. A method for producing the multilayer structure according to claim 1 having at least one base (X), at least one layer (Y), and at least one layer (Z), the layer (Y) containing an aluminum atom, the layer (Z) containing a polymer (E) having a plurality of phosphorus atoms, the polymer (E) being a polymer of at least one monomer including a vinylphosphonic acid compound, the multilayer structure including at least one pair of the layer (Y) and the layer (Z) that are contiguously stacked,
the method comprising a step (IV) of forming the layer (Z) by applying a coating liquid (V) containing the polymer (E).

15. The production method according to claim 14, wherein the polymer (E) is poly(vinylphosphonic acid) represented by the following general formula (I):

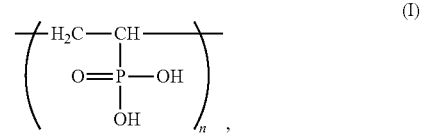

where n is a natural number.

16. The production method according to claim 14, wherein
when the layer (Y) is a layer (YA) containing a reaction product (R) and the reaction product (R) is a reaction product formed by reaction between a metal oxide (A) containing aluminum and a phosphorus compound (B), the method further comprises
a step (I) of mixing the metal oxide (A), at least one compound having a site capable of reacting with the metal oxide (A), and a solvent so as to prepare a coating liquid (U) containing the metal oxide (A), the at least one compound and the solvent,
a step (II) of applying the coating liquid (U) onto the base (X) so as to form a precursor layer of the layer (YA) on the base (X), and
a step (III) of heat-treating the precursor layer of the layer (YA) at a temperature of 110° C. or more so as to form the layer (YA),
the at least one compound includes the phosphorus compound (B), and
in the coating liquid (U), the number of moles $N_M$ of metal atoms (M) constituting the metal oxide (A) and the number of moles $N_p$ of phosphorus atoms contained in the phosphorus compound (B) satisfy a relationship of $1.0 \leq$ (the number of moles $N_M$)/(the number of moles $N_p$) $\leq 3.6$.

17. The production method according to claim 16, wherein the step (IV) is carried out after the step (III).

18. The production method according to claim 14, wherein the layer (Y) is a deposited layer of aluminum or a deposited layer of aluminum oxide.

19. The multilayer structure according to claim 1, wherein a thickness of the layer (Z) is 1.0 μm or less.

* * * * *